US012101210B2

(12) United States Patent
Dinan

(10) Patent No.: US 12,101,210 B2
(45) Date of Patent: *Sep. 24, 2024

(54) STARTING TIME ALIGNMENT TIMER BEFORE RECEIVING AN INITIAL TIMING ADVANCE COMMAND

(71) Applicant: Ofinno, LLC, Reston, VA (US)

(72) Inventor: Esmael Hejazi Dinan, McLean, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/210,177

(22) Filed: Jun. 15, 2023

(65) Prior Publication Data

US 2023/0327925 A1    Oct. 12, 2023

Related U.S. Application Data

(63) Continuation of application No. 17/395,556, filed on Aug. 6, 2021, now Pat. No. 11,695,603, which is a (Continued)

(51) Int. Cl.
*H04L 27/26* (2006.01)
*H04L 5/00* (2006.01)
*H04W 56/00* (2009.01)

(52) U.S. Cl.
CPC ............ *H04L 27/26* (2013.01); *H04L 5/0035* (2013.01); *H04W 56/0045* (2013.01)

(58) Field of Classification Search
CPC ....... H04L 5/0035; H04L 27/26; H04L 27/32; H04W 56/0045
See application file for complete search history.

(56) References Cited

U.S. PATENT DOCUMENTS 9,414,340 B2    8/2016    Dinan
2010/0074202 A1    3/2010    Park et al.
(Continued)

FOREIGN PATENT DOCUMENTS

EP    0589753 B1    12/2003
EP    2695317 B1    11/2018
(Continued)

OTHER PUBLICATIONS

R2-122584; 3GPP TSG-RAN WG2 #78; Prague, Czech Republic, May 21-25, 2012; Source: Ericsson, ST-Ericsson; Title: Timing Advance value initialization; Document for: Discussion, Decision.
(Continued)

*Primary Examiner* — Jamal Javaid
*Assistant Examiner* — Ryan C Kavleski
(74) *Attorney, Agent, or Firm* — Grace Gao; Kavon Nasabzadeh; Philip R. Smith

(57) ABSTRACT

A base station transmits a radio resource control (RRC) message indicating that a wireless device starts a time alignment timer of a timing advance group (TAG) in response to the RRC message. The base station starts the time alignment timer of the TAG before transmitting an initial medium access control (MAC) timing advance command (TAC) for the TAG and after transmitting the RRC message.

19 Claims, 26 Drawing Sheets

Related U.S. Application Data continuation of application No. 16/537,876, filed on Aug. 12, 2019, now Pat. No. 11,088,881, which is a continuation of application No. 15/202,334, filed on Jul. 5, 2016, now Pat. No. 10,382,238.

(60) Provisional application No. 62/188,696, filed on Jul. 5, 2015.

(56) References Cited

U.S. PATENT DOCUMENTS

| | | | |
|---|---|---|---|
| 2010/0177747 A1 | 7/2010 | Chun et al. | |
| 2010/0284376 A1 | 11/2010 | Park et al. | |
| 2011/0170535 A1 | 7/2011 | Wang et al. | |
| 2012/0257570 A1* | 10/2012 | Jang | H04W 52/50 370/328 |
| 2012/0300752 A1 | 11/2012 | Kwon et al. | |
| 2013/0003673 A1 | 1/2013 | Dinan | |
| 2013/0188612 A1 | 7/2013 | Dinan | |
| 2013/0250929 A1 | 9/2013 | Dinan | |
| 2013/0260735 A1 | 10/2013 | Dinan | |
| 2013/0279433 A1* | 10/2013 | Dinan | H04W 72/23 370/329 |
| 2013/0336294 A1 | 12/2013 | Dinan | |
| 2014/0086219 A1 | 3/2014 | Suzuki et al. | |
| 2014/0228013 A1 | 8/2014 | Yang et al. | |
| 2015/0049753 A1 | 2/2015 | Park et al. | |
| 2015/0071261 A1 | 3/2015 | Lee et al. | |
| 2015/0327107 A1 | 11/2015 | Kim et al. | |
| 2016/0212737 A1 | 7/2016 | Jang et al. | |
| 2017/0013565 A1 | 1/2017 | Pelletier et al. | |
| 2018/0077749 A1 | 3/2018 | Yamada et al. | |

FOREIGN PATENT DOCUMENTS

| | | | |
|---|---|---|---|
| EP | 2709292 B1 | 9/2021 | |
| WO | WO-2010104279 A2 * | 9/2010 | H04W 36/385 |

OTHER PUBLICATIONS

R2-123804; 3GPP TSG-RAN WG2 #79; Qingdao, China, Aug. 13-17, 2012; Agenda Item: 7.1.2; Source: Ericsson, ST-Ericsson; Title: Clarification of TA value maintenance at TA timer expiry; Document for: Discussion, Decision.

R2-123805; 3GPP TSG-RAN WG2 #79; Qingdao, China, Aug. 13-17, 2012; Agenda Item: 7.1.2; Source: Ericsson, ST-Ericsson; Title: Timing Advance value initialization; Document for: Discussion, Decision.

R2-150383; 3GPP TSG-RAN WG2 #89; Athens, Greece, Feb. 9-13, 2015; Agenda Item: 7.1; Source: Ericsson; Title: Initial overview of RAN2 impact due to LAA; Document for: Discussion, Decision.

R2-151651; 3GPP TSG-RAN WG2 Meeting #89bis; Bratislava, Slovakia, Apr. 20-24, 2015; Agenda Item: 7.1.1 (FS_LTE_LAA); Source: LG Electronics Inc.; Title: Random Access aspect of LAA; Document for: Discussion and Decision.

R2-152220; 3GPP TSG-RAN WG2 Meeting #89bis; Fukuoka, Japan, May 25-29, 2015; Agenda Item: 7.1.3; Source: Huawei, HiSilicon; Title: Uplink Transmissions via LAA Cell; Document for: Discussion and Decision.

R2-152365; 3GPP TSG-RAN WG2 Meeting #90; Fukuoka, Japan, May 25-29, 2015; Agenda Item : 7.1.3 (FS_LTE_LAA); Source: LG Electronics Inc.; Title: Random Access aspect of LAA; Document for : Discussion and Decision.

R2-152385; 3GPP TSG-RAN2 Meeting #90; Fukuoka, Japan, May 25-29, 2015; Source: Samsung; Title: Random Access on LAA SCell; Agenda item: 7.1.3; Document for: Discussion and Agreement.

R2-152484; 3GPP TSG-RAN WG2 #90; Fukuoka, Japan, May 25-29, 2015; Agenda Item: 7.1.3; Source: Ericsson; Title: Random Access and RLM in LAA; Document for: Discussion, Decision.

3GPP TR 36.889 V1.0.1 (Jun. 2015); Technical Report, 3rd Generation Partnership Project; Technical Specification Group Radio Access Network; Study on Licensed-Assisted Access to Unlicensed Spectrum; (Release 13).

3GPP TS 36.321 V12.4.0 (Dec. 2014); Technical Specification; 3rd Generation Partnership Project; Technical Specification Group Radio Access Network; Evolved Universal Terrestrial Radio Access (E-UTRA); Medium Access Control (MAC) protocol specification; (Release 12).

3GPP TS 36.300 V12.4.0 (Dec. 2014); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; (Release 12).

3GPP TS 36.213 V12.5.0 (Mar. 2015); echnical Specification; 3rd Generation Partnership Project; Technical Specification Group Radio Access Network; Evolved Universal Terrestrial Radio Access (E-UTRA); Physical layer procedures; (Release 12).

R1-070045; 3GPP TSG RAN1#47-bis; Sorrento, Italy; Jan. 15-19, 2006; Agenda Item: 6.11; Source: Motorola; Title: Uplink Timing Control; Document for: Discussion.

R1-070106; 3GPP TSG RAN WG1 Meeting #47bis; Sorrento, Italy, Jan. 15-19, 2007; Source: NTT DoCoMo, Fujitsu, NEC, Panasonic, Sharp, Toshiba Corporation; Title: Uplink Timing Control for E-UTRA; Agenda Item: 6.11; Document for: Discussion and Decision.

Tdoc R1-070531; 3GPP TSG RAN WG1#47bis; Sorrento, Italy; Jan. 15-19, 2007; Agenda Item: 6.11; Source: IPWireless; Title:Preferences for UL Timing Control; Document for: Discussion.

Tdoc R2-070530; 3GPP TSG RAN WG2 #57; Feb. 12-16, 2006; St. Louis, USA; Source: LG Electronics Inc.; Title: How to transmit TA information; Agenda Item: 11.8; Document for: Discussion and decision.

R1-071245; 3GPP TSG RAN WG1 Meeting #48; St Louis, US, Feb. 12-16, 2007; Agenda item 3; Title: Approved Report of 3GPP TSG RAN WG1 #47bis v2.0.0 (Sorrento, Italy, Jan. 15-19, 2007); Document for: Information; Source: MCC Support.

* cited by examiner

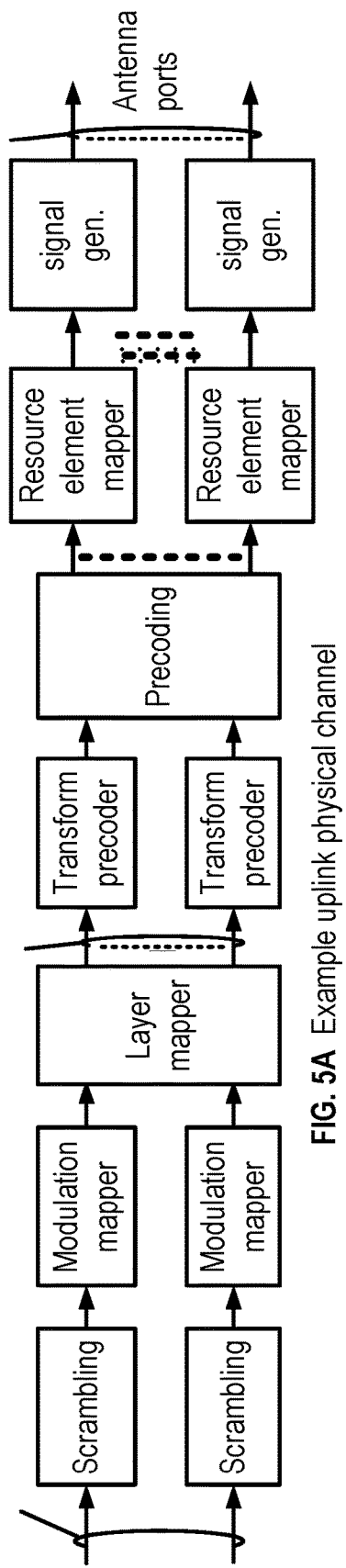
FIG. 5A Example uplink physical channel
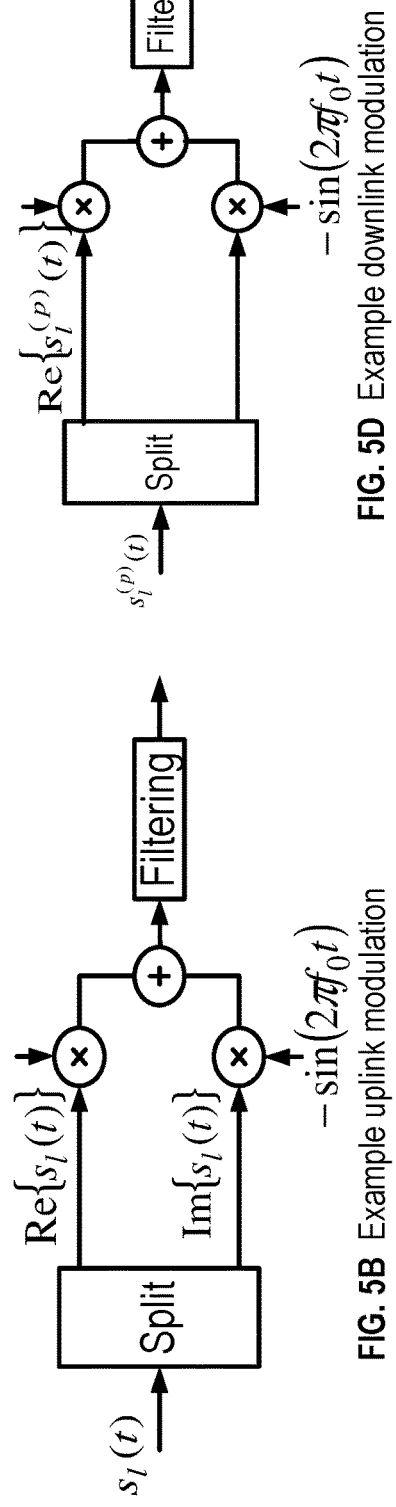
FIG. 5B Example uplink modulation
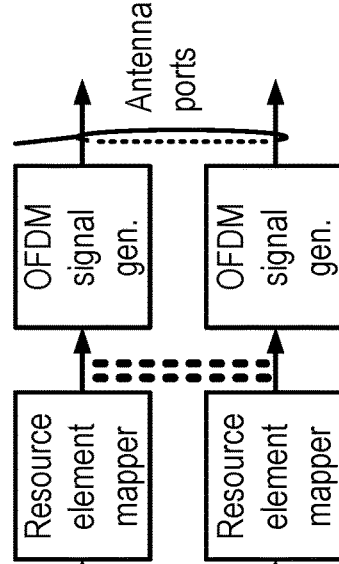
FIG. 5D Example downlink modulation
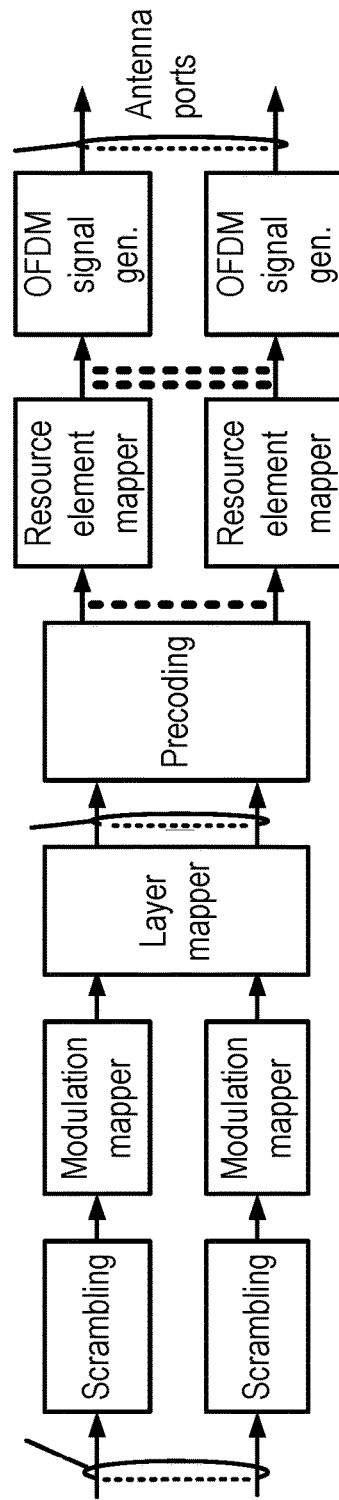
FIG. 5C Example downlink physical channel Dual-Connectivity at eNB

FIG. 7 Dual-Connectivity- two MAC entities at UE side

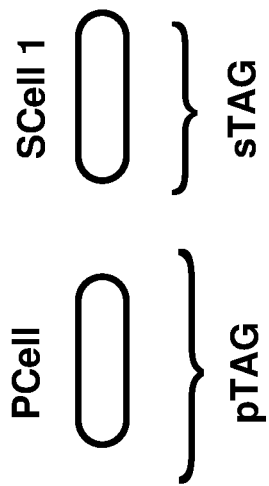
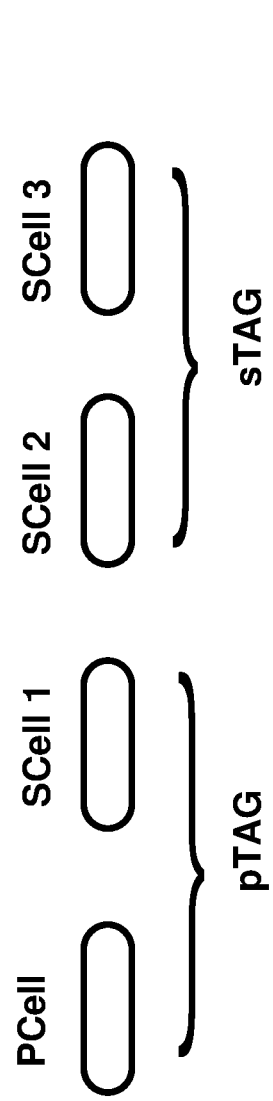
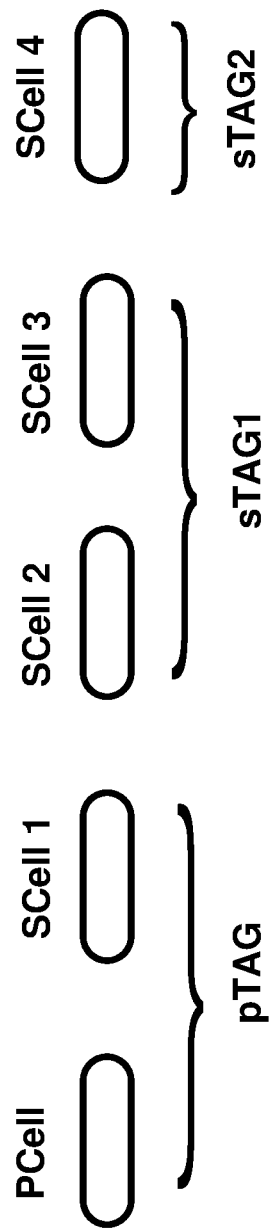
FIG. 8

STARTING TIME ALIGNMENT TIMER BEFORE RECEIVING AN INITIAL TIMING ADVANCE COMMAND

CROSS-REFERENCE TO RELATED APPLICATIONS

This application is a continuation of U.S. patent application Ser. No. 17/395,556, filed Aug. 6, 2021, which is a continuation of U.S. patent application Ser. No. 16/537,876, filed Aug. 12, 2019 (now U.S. Pat. No. 11,088,881, issued on Aug. 10, 2021), which is a continuation of U.S. patent application Ser. No. 15/202,334, filed Jul. 5, 2016 (now U.S. Pat. No. 10,382,238, issued on Aug. 13, 2019), which claims the benefit of U.S. Provisional Application No. 62/188,696, filed Jul. 5, 2015, all of which are hereby incorporated by reference in their entireties.

BRIEF DESCRIPTION OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

FIG. 8 shows example TAG configurations as per an aspect of an embodiment of the present invention.

DETAILED DESCRIPTION

Figure 1:
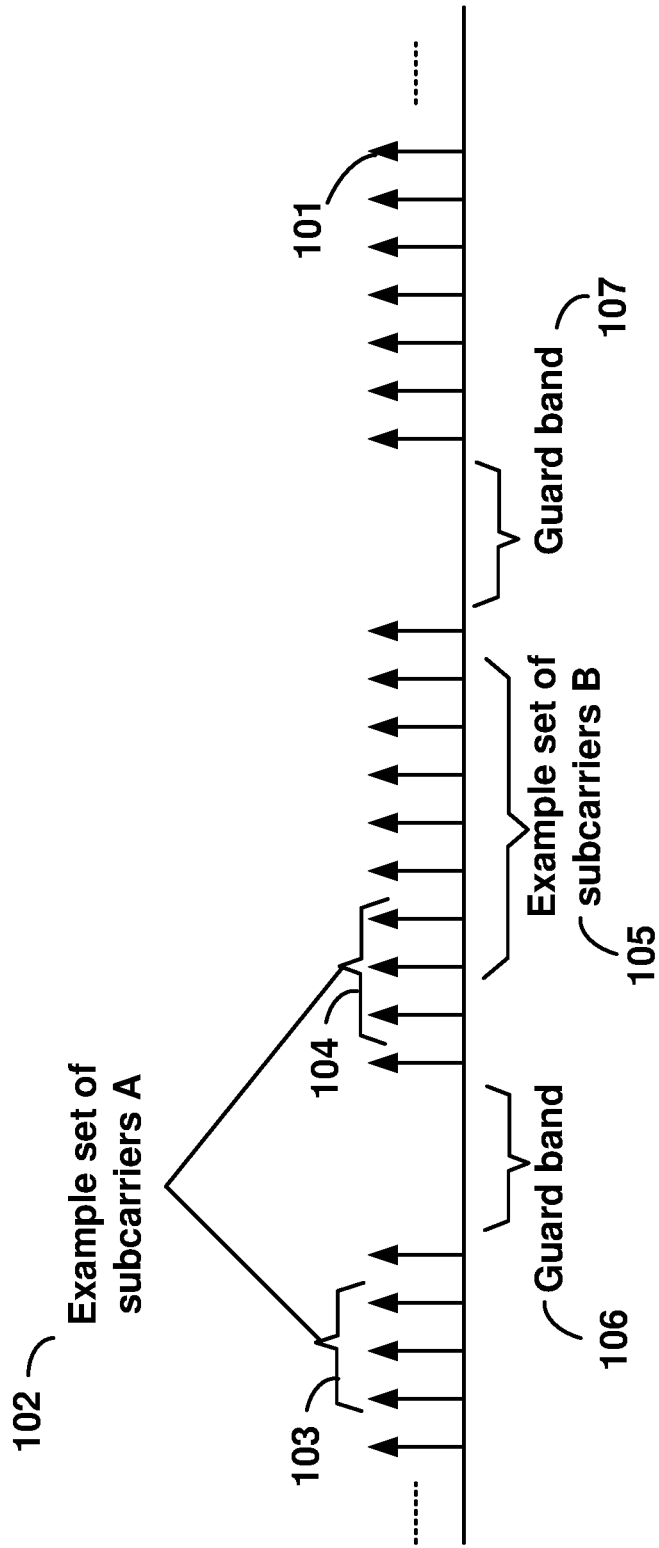
FIG. 1 is a diagram depicting example sets of OFDM subcarriers as per an aspect of an embodiment of the present invention.

Example embodiments of the present invention enable operation of carrier aggregation. Embodiments of the technology disclosed herein may be employed in the technical field of multicarrier communication systems. More particularly, the embodiments of the technology disclosed herein may relate to operation of uplink transmissions and/or random access processes in a carrier aggregation.

The following Acronyms are used throughout the present disclosure:

| | |
|---|---|
| ASIC | application-specific integrated circuit |
| BPSK | binary phase shift keying |
| CA | carrier aggregation |
| CSI | channel state information |
| CDMA | code division multiple access |
| CSS | common search space |
| CPLD | complex programmable logic devices |
| CC | component carrier |
| DL | downlink |
| DCI | downlink control information |
| DC | dual connectivity |
| EPC | evolved packet core |
| E-UTRAN | evolved-universal terrestrial radio access network |
| FPGA | field programmable gate arrays |
| FDD | frequency division multiplexing |
| HDL | hardware description languages |
| HARQ | hybrid automatic repeat request |
| IE | information element |
| LAA | licensed assisted access |
| LTE | long term evolution |
| MCG | master cell group |
| MeNB | master evolved node B |
| MIB | master information block |

| | |
|---|---|
| MAC | media access control |
| MAC | media access control |
| MME | mobility management entity |
| NAS | non-access stratum |
| OFDM | orthogonal frequency division multiplexing |
| PDCP | packet data convergence protocol |
| PDU | packet data unit |
| PHY | physical |
| PDCCH | physical downlink control channel |
| PHICH | physical HARQ indicator channel |
| PUCCH | physical uplink control channel |
| PUSCH | physical uplink shared channel |
| PCell | primary cell |
| PCell | primary cell |
| PCC | primary component carrier |
| PSCell | primary secondary cell |
| pTAG | primary timing advance group |
| QAM | quadrature amplitude modulation |
| QPSK | quadrature phase shift keying |
| RBG | Resource Block Groups |
| RLC | radio link control |
| RRC | radio resource control |
| RA | random access |
| RB | resource blocks |
| SCC | secondary component carrier |
| SCell | secondary cell |
| Scell | secondary cells |
| SCG | secondary cell group |
| SeNB | secondary evolved node B |
| sTAGs | secondary timing advance group |
| SDU | service data unit |
| S-GW | serving gateway |
| SRB | signaling radio bearer |
| SC-OFDM | single carrier-OFDM |
| SFN | system frame number |
| SIB | system information block |
| TAI | tracking area identifier |
| TAT | time alignment timer |
| TDD | time division duplexing |
| TDMA | time division multiple access |
| TA | timing advance |
| TAG | timing advance group |
| TB | transport block |
| UL | uplink |
| UE | user equipment |
| VHDL | VHSIC hardware description language |

Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
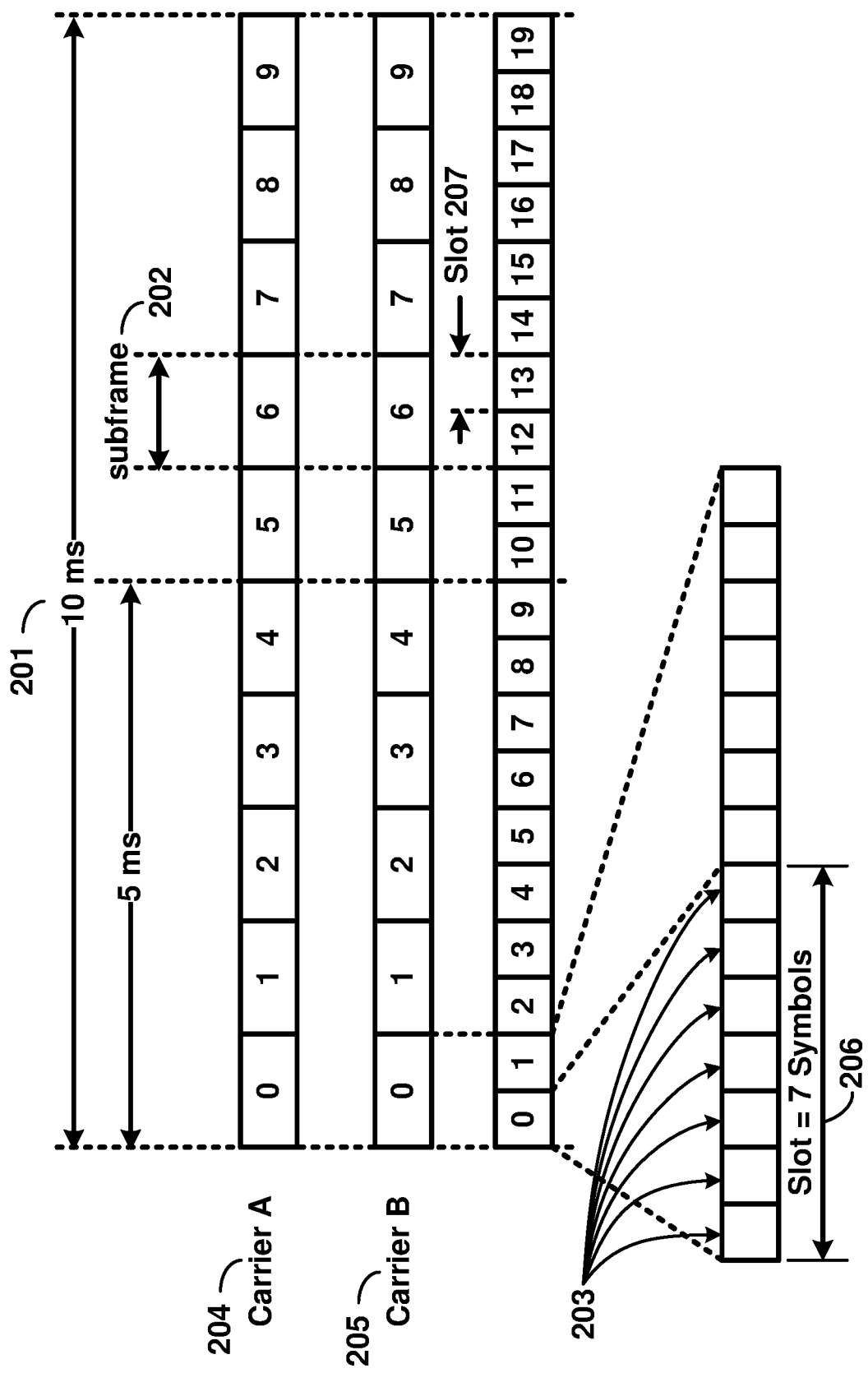
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
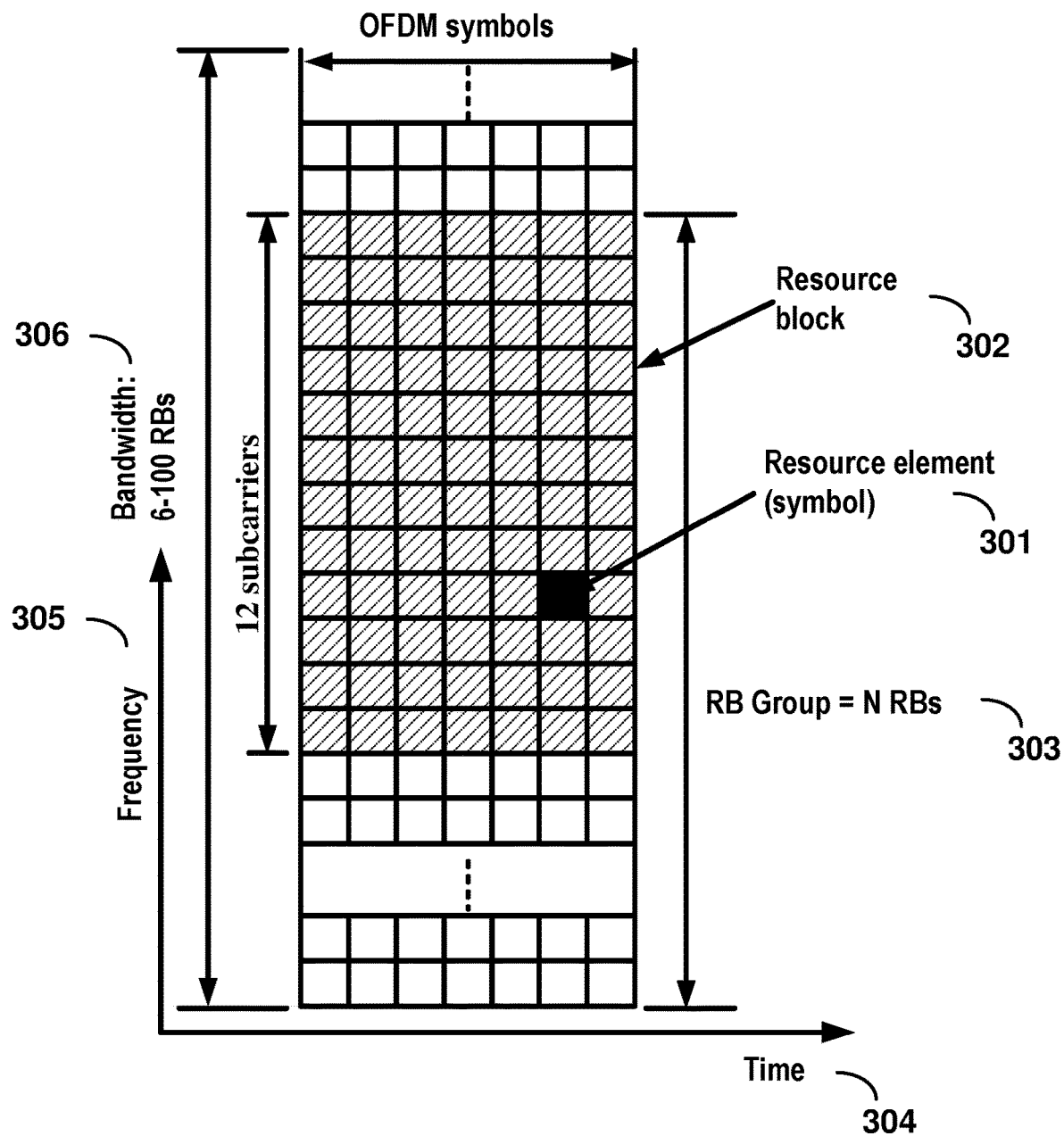
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. resource element 301). Resource elements may be grouped into resource blocks (e.g. resource block 302). Resource blocks may be grouped into larger radio resources called Resource Block Groups (RBG) (e.g. Resource Block Group 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain SC-FDMA signal for each antenna port, and/or the like.

Example modulation and up-conversion to the carrier frequency of the complex-valued SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
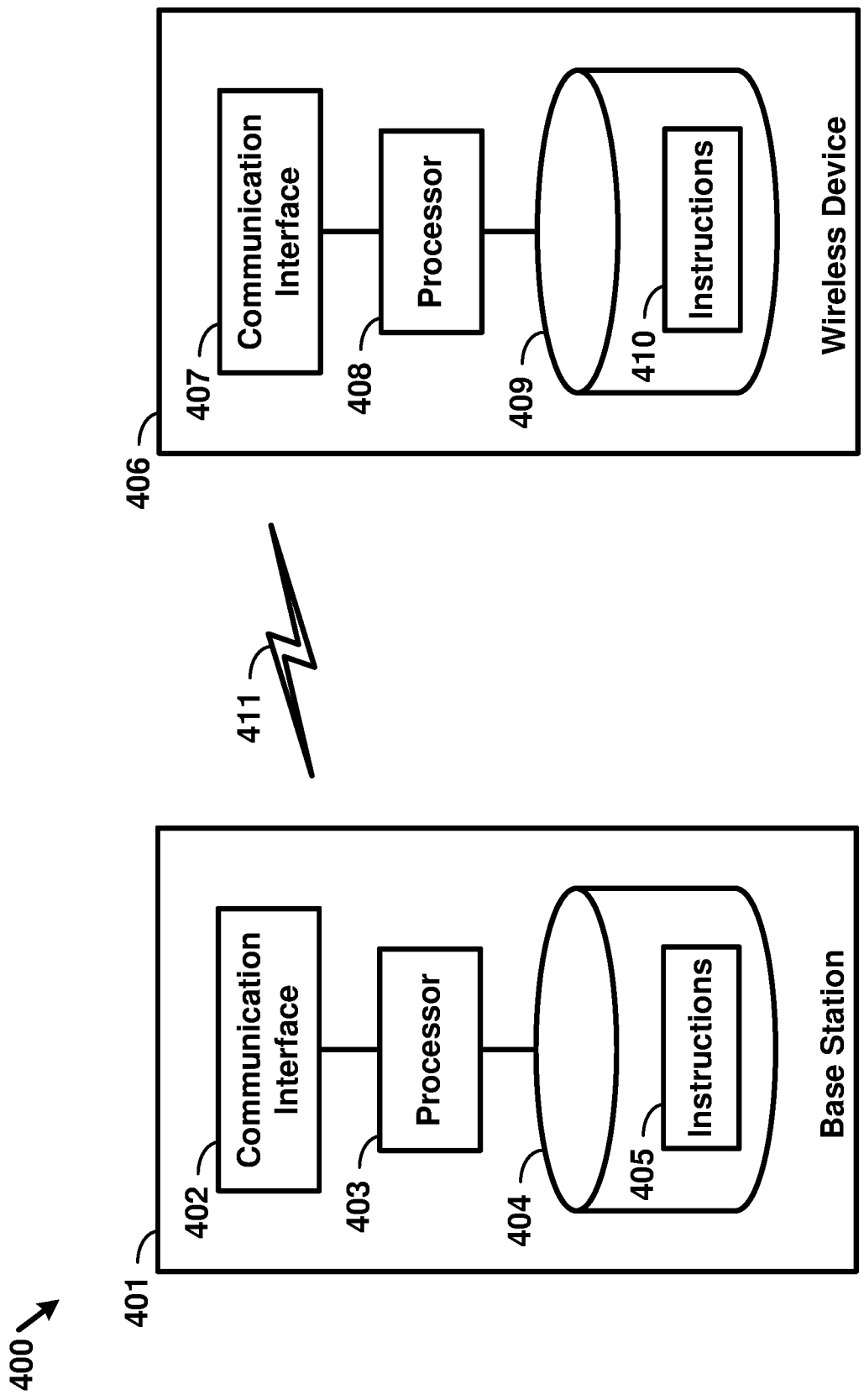
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5A, FIG. 5B, FIG. 5C, FIG. 5D, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, an LTE network may include a multitude of base stations, providing a user plane PDCP/RLC/MAC/PHY and control plane (RRC) protocol terminations towards the wireless device. The base station(s) may be interconnected with other base station(s) (e.g. employing an X2 interface). The base stations may also be connected employing, for example, an S1 interface to an EPC. For example, the base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
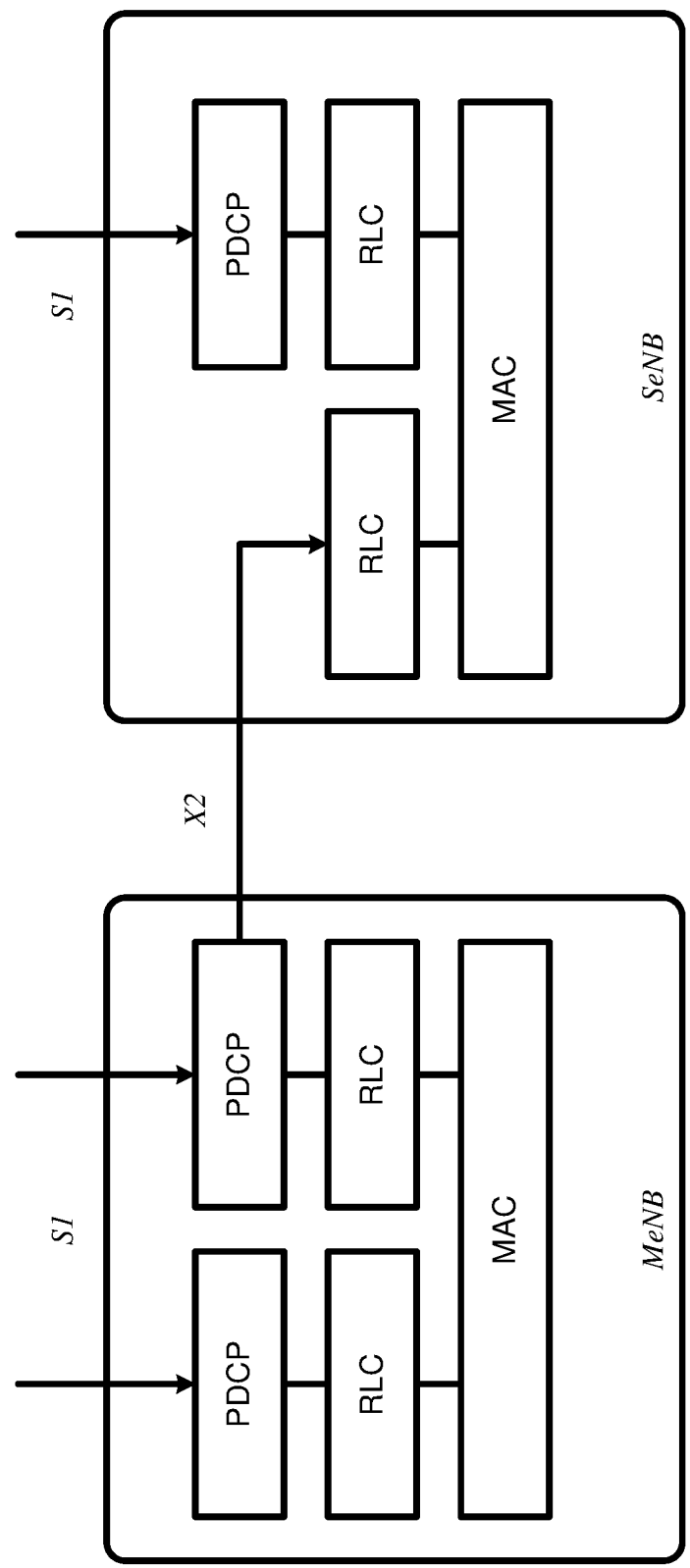
FIG. 6 is an example diagram for a protocol structure with CA and DC as per an aspect of an embodiment of the present invention.
Figure 7:
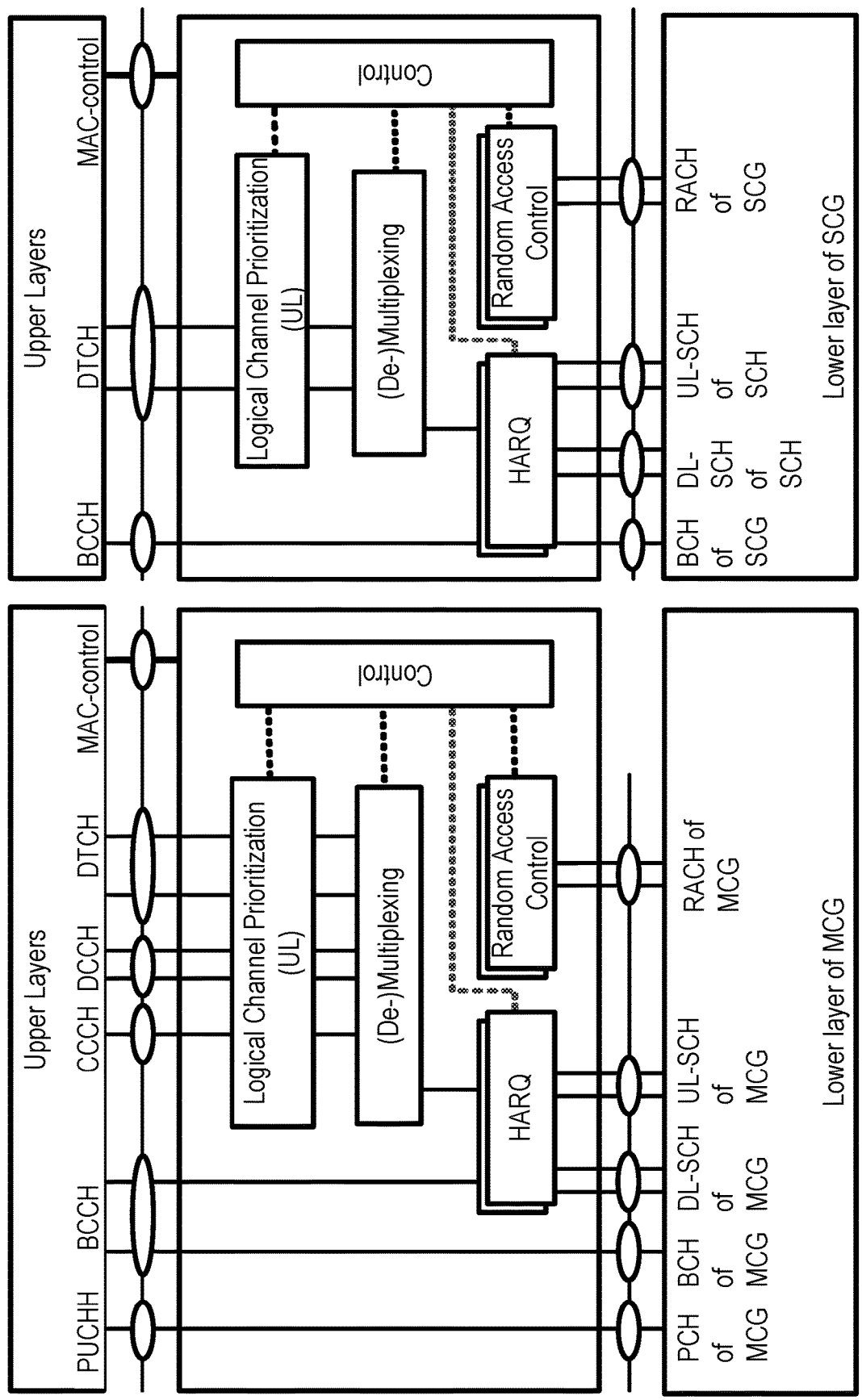
FIG. 7 is an example diagram for a protocol structure with CA and DC as per an aspect of an embodiment of the present invention.

FIG. 6 and FIG. 7 are example diagrams for protocol structure with CA and DC as per an aspect of an embodiment of the present invention. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the invention.

In the case of DC, the UE may be configured with two MAC entities: one MAC entity for MeNB, and one MAC entity for SeNB. In DC, the configured set of serving cells for a UE may comprise of two subsets: the Master Cell Group (MCG) containing the serving cells of the MeNB, and the Secondary Cell Group (SCG) containing the serving cells of the SeNB. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a MeNB may be informed by the UE of a SCG failure type, for split bearer, the DL data transfer over the MeNB is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a MeNB and a SeNB, one or more of the following principles may be applied: the MeNB may maintain the RRM measurement configuration of the UE and may, (e.g. based on received measurement reports or traffic conditions or bearer types), decide to ask a SeNB to provide additional resources (serving cells) for a UE; upon receiving a request from the MeNB, a SeNB may create a container that may result in the configuration of additional serving cells for the UE (or decide that it has no resource available to do so); for UE capability coordination, the MeNB may provide (part of) the AS configuration and the UE capabilities to the SeNB; the MeNB and the SeNB may exchange information about a UE configuration by employing of RRC containers (inter-node messages) carried in X2 messages; the SeNB may initiate a reconfiguration of its existing serving cells (e.g., PUCCH towards the SeNB); the SeNB may decide which cell is the PSCell within the SCG; the MeNB may not change the content of the RRC configuration provided by the SeNB; in the case of a SCG addition and a SCG SCell addition, the MeNB may provide the latest measurement results for the SCG cell(s); both a MeNB and a SeNB may know the SFN and subframe offset of each other by OAM, (e.g., for the purpose of DRX alignment and identification of a measurement gap). In an example, when adding a new SCG SCell, dedicated RRC signalling may be used for sending required system information of the cell as for CA, except for the SFN acquired from a MIB of the PSCell of a SCG.

According to some of the various aspects of embodiments, serving cells having an uplink to which the same time alignment (TA) applies may be grouped in a TA group (TAG). Serving cells in one TAG may use the same timing reference. For a given TAG, user equipment (UE) may use one downlink carrier as a timing reference at a given time. The UE may use a downlink carrier in a TAG as a timing reference for that TAG. For a given TAG, a UE may synchronize uplink subframe and frame transmission timing of uplink carriers belonging to the same TAG. According to some of the various aspects of embodiments, serving cells having an uplink to which the same TA applies may correspond to serving cells hosted by the same receiver. A TA group may comprise at least one serving cell with a configured uplink. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). Carriers within the same TA group may use the same TA value and the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. The operation with one example sTAG is described, and the same operation may be applicable to other sTAGs. The example mechanisms may be applied to configurations with multiple sTAGs.

According to some of the various aspects of embodiments, TA maintenance, pathloss reference handling and a timing reference for a pTAG may follow LTE release 10 principles in the MCG and/or SCG. The UE may need to measure downlink pathloss to calculate uplink transmit power. A pathloss reference may be used for uplink power control and/or transmission of random access preamble(s). UE may measure downlink pathloss using signals received on a pathloss reference cell. For SCell(s) in a pTAG, the choice of a pathloss reference for cells may be selected from and/or be limited to the following two options: a) the downlink SCell linked to an uplink SCell using system information block 2 (SIB2), and b) the downlink pCell. The pathloss reference for SCells in a pTAG may be configurable using RRC message(s) as a part of an SCell initial configuration and/or reconfiguration. According to some of the various aspects of embodiments, a PhysicalConfigDedicatedSCell information element (IE) of an SCell configuration may include a pathloss reference SCell (downlink carrier) for an SCell in a pTAG. The downlink SCell linked to an uplink SCell using system information block 2 (SIB2) may be referred to as the SIB2 linked downlink of the SCell. Different TAGs may operate in different bands. For an uplink carrier in an sTAG, the pathloss reference may be only configurable to the downlink SCell linked to an uplink SCell using the system information block 2 (SIB2) of the SCell.

To obtain initial uplink (UL) time alignment for an sTAG, an eNB may initiate an RA procedure. In an sTAG, a UE may use one of any activated SCells from this sTAG as a timing reference cell. In an example embodiment, the timing reference for SCells in an sTAG may be the SIB2 linked downlink of the SCell on which the preamble for the latest RA procedure was sent. There may be one timing reference and one time alignment timer (TAT) per TA group. A TAT for TAGs may be configured with different values. In a MAC entity, when a TAT associated with a pTAG expires: all TATs may be considered as expired, the UE may flush HARQ buffers of serving cells, the UE may clear any configured downlink assignment/uplink grants, and the RRC in the UE may release PUCCH/SRS for all configured serving cells. When the pTAG TAT is not running, an sTAG TAT may not be running. When the TAT associated with an sTAG expires: a) SRS transmissions may be stopped on the corresponding SCells, b) SRS RRC configuration may be released, c) CSI reporting configuration for corresponding SCells may be maintained, and/or d) the MAC in the UE may flush the uplink HARQ buffers of the corresponding SCells.

An eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
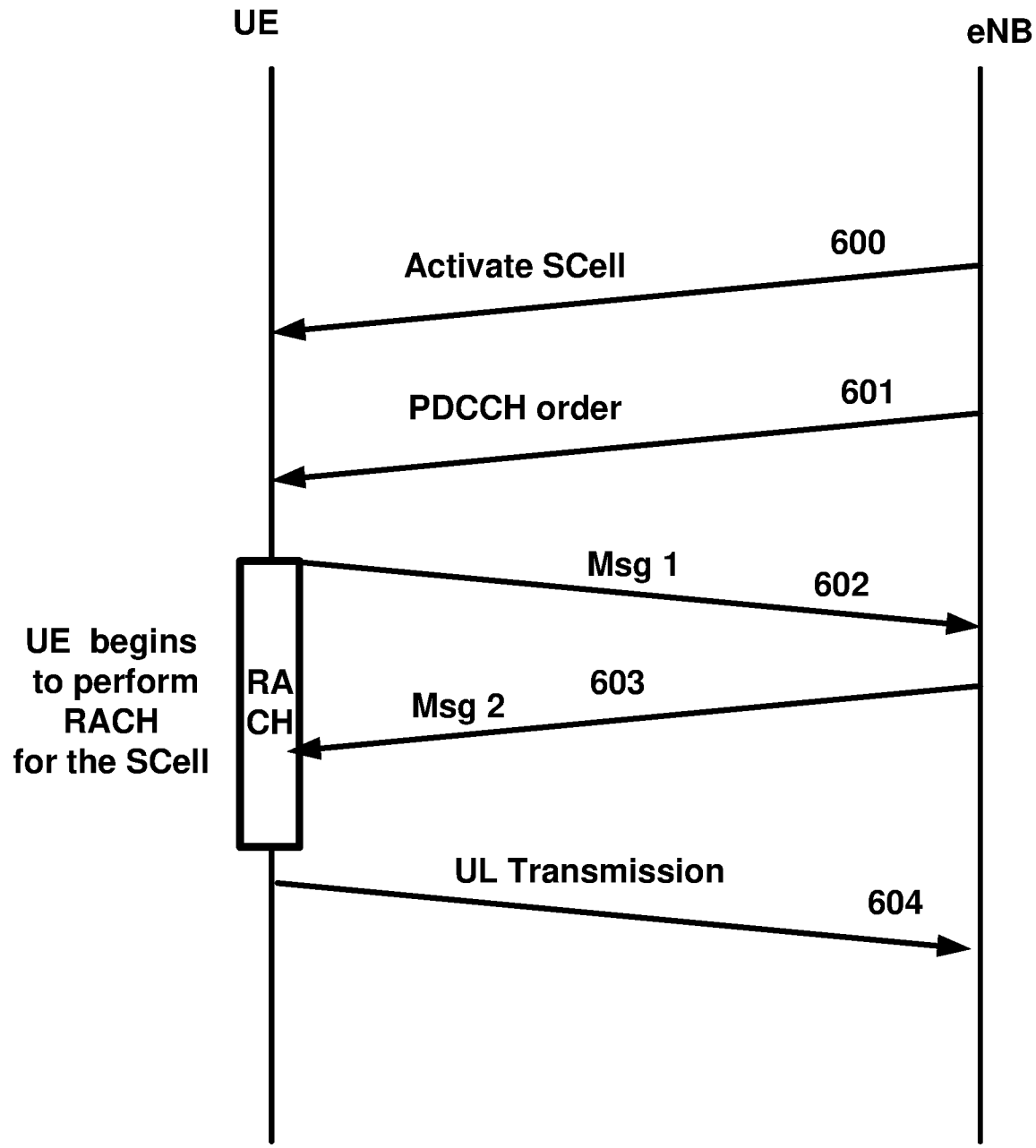
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may always be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

Figure 10:
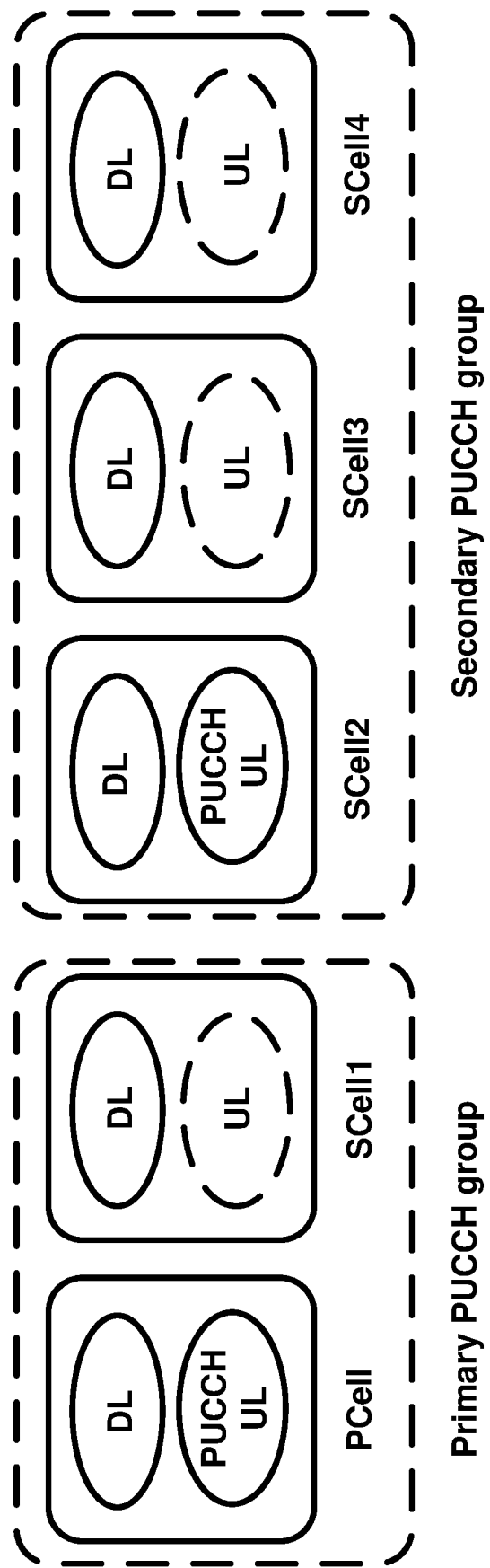
FIG. 10 is an example grouping of cells into PUCCH groups as per an aspect of an embodiment of the present invention.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. FIG. 10 is an example grouping of cells into PUCCH groups as per an aspect of an embodiment of the present invention. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In Release-12, a PUCCH can be configured on a PCell and/or a PSCell, but cannot be configured on other SCells. In an example embodiment, a UE may transmit a message indicating that the UE supports PUCCH configuration on a PCell and SCell. Such an indication may be separate from an indication of dual connectivity support by the UE. In an example embodiment, a UE may support both DC and PUCCH groups. In an example embodiment, either DC or PUCCH groups may be configured, but not both. In another example embodiment, more complicated configurations comprising both DC and PUCCH groups may be supported.

When a UE is capable of configuring PUCCH groups, and if a UE indicates that it supports simultaneous PUCCH/PUSCH transmission capability, it may imply that the UE supports simultaneous PUCCH/PUSCH transmission on both PCell and SCell. When multiple PUCCH groups are configured, a PUCCH may be configured or not configured with simultaneous PUCCH/PUSCH transmission.

In an example embodiment, PUCCH transmission to a base station on two serving cells may be realized as shown in FIG. 10. A first group of cells may employ a PUCCH on the PCell and may be called PUCCH group 1 or a primary PUCCH group. A second group of cells may employ a PUCCH on an SCell and may be called PUCCH group 2 or a secondary PUCCH group. One, two or more PUCCH groups may be configured. In an example, cells may be grouped into two PUCCH groups, and each PUCCH group may include a cell with PUCCH resources. A PCell may provide PUCCH resources for the primary PUCCH group and an SCell in the secondary PUCCH group may provide PUCCH resources for the cells in the secondary PUCCH group. In an example embodiment, no cross-carrier scheduling between cells in different PUCCH groups may be configured. When cross-carrier scheduling between cells in different PUCCH groups is not configured, ACK/NACK on PHICH channel may be limited within a PUCCH group. Both downlink and uplink scheduling activity may be separate between cells belonging to different PUCCH groups.

A PUCCH on an SCell may carry HARQ-ACK and CSI information. A PCell may be configured with PUCCH resources. In an example embodiment, RRC parameters for an SCell PUCCH Power Control for a PUCCH on an SCell may be different from those of a PCell PUCCH. A Transmit Power Control command for a PUCCH on an SCell may be transmitted in DCI(s) on the SCell carrying the PUCCH.

UE procedures on a PUCCH transmission may be different and/or independent between PUCCH groups. For example, determination of DL HARQ-ACK timing, PUCCH resource determination for HARQ-ACK and/or CSI, Higher-layer configuration of simultaneous HARQ-ACK+CSI on a PUCCH, Higher-layer configuration of simultaneous HARQ-ACK+SRS in one subframe may be configured differently for a PUCCH PCell and a PUCCH SCell.

A PUCCH group may be a group of serving cells configured by a RRC and use the same serving cell in the group for transmission of a PUCCH. A Primary PUCCH group may be a PUCCH group containing a PCell. A secondary PUCCH group may be a PUCCH cell group not containing the PCell. In an example embodiment, an SCell may belong to one PUCCH group. When one SCell belongs to a PUCCH group, ACK/NACK or CSI for that SCell may be transmitted over the PUCCH in that PUCCH group (over PUCCH SCell or PUCCH PCell). A PUCCH on an SCell may reduce the PUCCH load on the PCell. A PUCCH SCell may be employed for UCI transmission of SCells in the corresponding PUCCH group.

In an example embodiment, a flexible PUCCH configuration in which control signalling is sent on one, two or more PUCCHs may be possible. Beside the PCell, it may be possible to configure a selected number of SCells for PUCCH transmission (herein called PUCCH SCells). Control signalling information conveyed in a certain PUCCH SCell may be related to a set of SCells in a corresponding PUCCH group that are configured by the network via RRC signalling.

PUCCH control signalling carried by a PUCCH channel may be distributed between a PCell and SCells for offloading or robustness purposes. By enabling a PUCCH in an SCell, it may be possible to distribute the overall CSI reports for a given UE between a PCell and a selected number of SCells (e.g. PUCCH SCells), thereby limiting PUCCH CSI resource consumption by a given UE on a certain cell. It may be possible to map CSI reports for a certain SCell to a selected PUCCH SCell. An SCell may be assigned a certain periodicity and time-offset for transmission of control information. Periodic CSI for a serving cell may be mapped on a PUCCH (on the PCell or on a PUCCH-SCell) via RRC signalling. The possibility of distributing CSI reports, HARQ feedbacks, and/or Scheduling Requests across PUCCH SCells may provide flexibility and capacity improvements. HARQ feedback for a serving cell may be mapped on a PUCCH (on the PCell or on a PUCCH SCell) via RRC signalling.

In example embodiments, PUCCH transmission may be configured on a PCell, as well as one SCell in CA. An SCell PUCCH may be realized using the concept of PUCCH groups, where aggregated cells are grouped into two or more PUCCH groups. One cell from a PUCCH group may be configured to carry a PUCCH. More than 5 carriers may be configured. In the example embodiments, up to n carriers may be aggregated. For example, n may be 16, 32, or 64. Some CCs may have non-backward compatible configurations supporting only advanced UEs (e.g. support licensed assisted access SCells). In an example embodiment, one SCell PUCCH (e.g. two PUCCH groups) may be supported. In another example embodiment, a PUCCH group concept with multiple (more than one) SCells carrying PUCCH may be employed (e.g., there can be more than two PUCCH groups).

In an example embodiment, a given PUCCH group may not comprise serving cells of both MCG and SCG. One of the PUCCHs may be configured on the PCell. In an example embodiment, PUCCH mapping of serving cells may be configured by RRC messages. In an example embodiment, a maximum value of an SCellIndex and a ServCellIndex may be 31 (ranging from 0 to 31). In an example, a maximum value of stag-Id may be 3. The CIF for a scheduled cell may be configured explicitly. A PUCCH SCell may be configured by giving a PUCCH configuration for an SCell. A HARQ feedback and CSI report of a PUCCH SCell may be sent on the PUCCH of that PUCCH SCell. The HARQ feedback and CSI report of a SCell may sent on a PUCCH of a PCell if no PUCCH SCell is signalled for that SCell. The HARQ feedback and CSI report of an SCell may be sent on the PUCCH of one PUCCH SCell; hence they may not be sent on the PUCCH of different PUCCH SCell. The UE may report a Type 2 PH for serving cells configured with a PUCCH. In an example embodiment, a MAC activation/deactivation may be supported for a PUCCH SCell. An eNB may manage the activation/deactivation status for SCells. A newly added PUCCH SCell may be initially deactivated.

Figure 11:
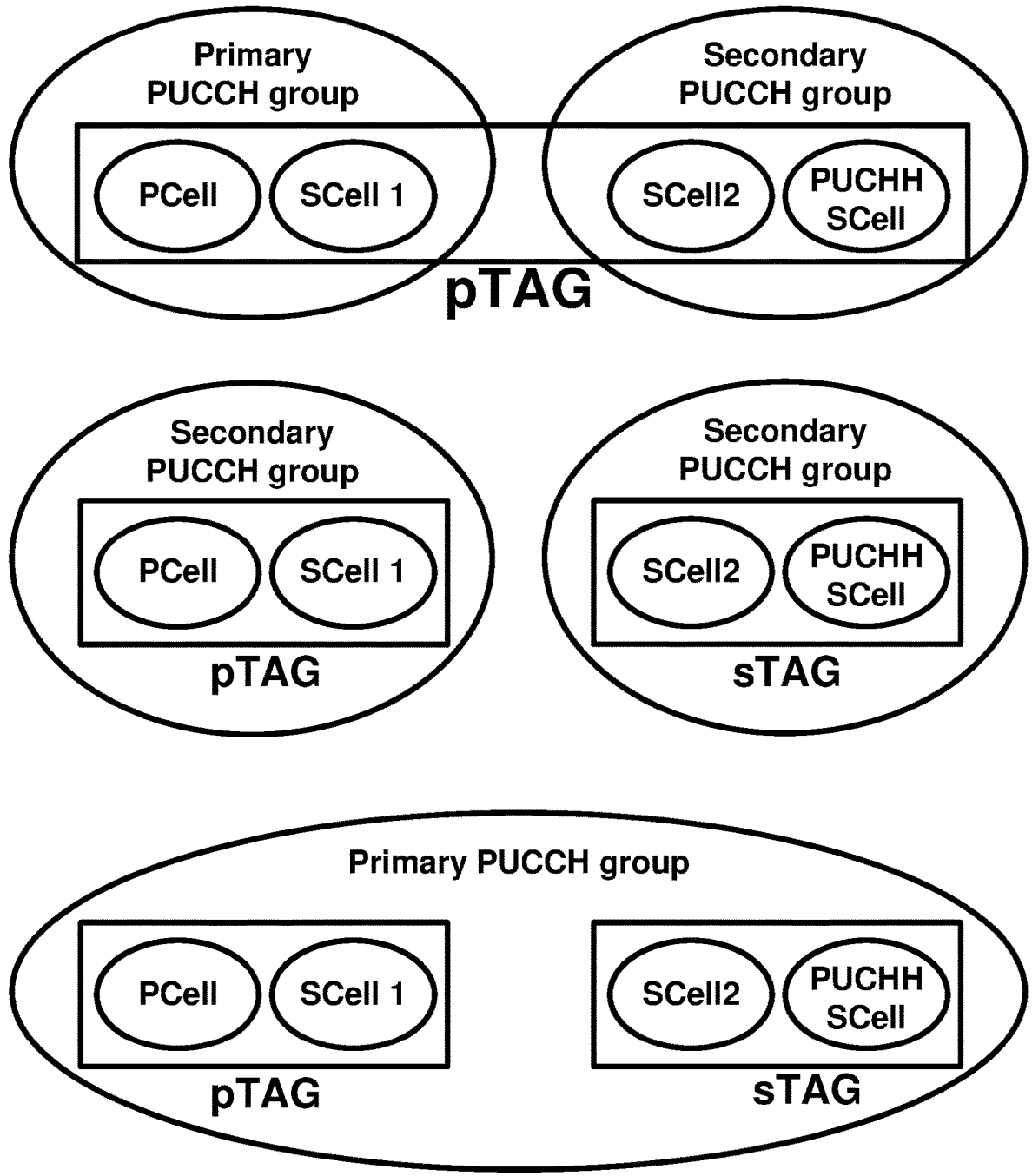
FIG. 11 illustrates example groupings of cells into one or more PUCCH groups and one or more TAGs as per an aspect of an embodiment of the present invention.
Figure 12:
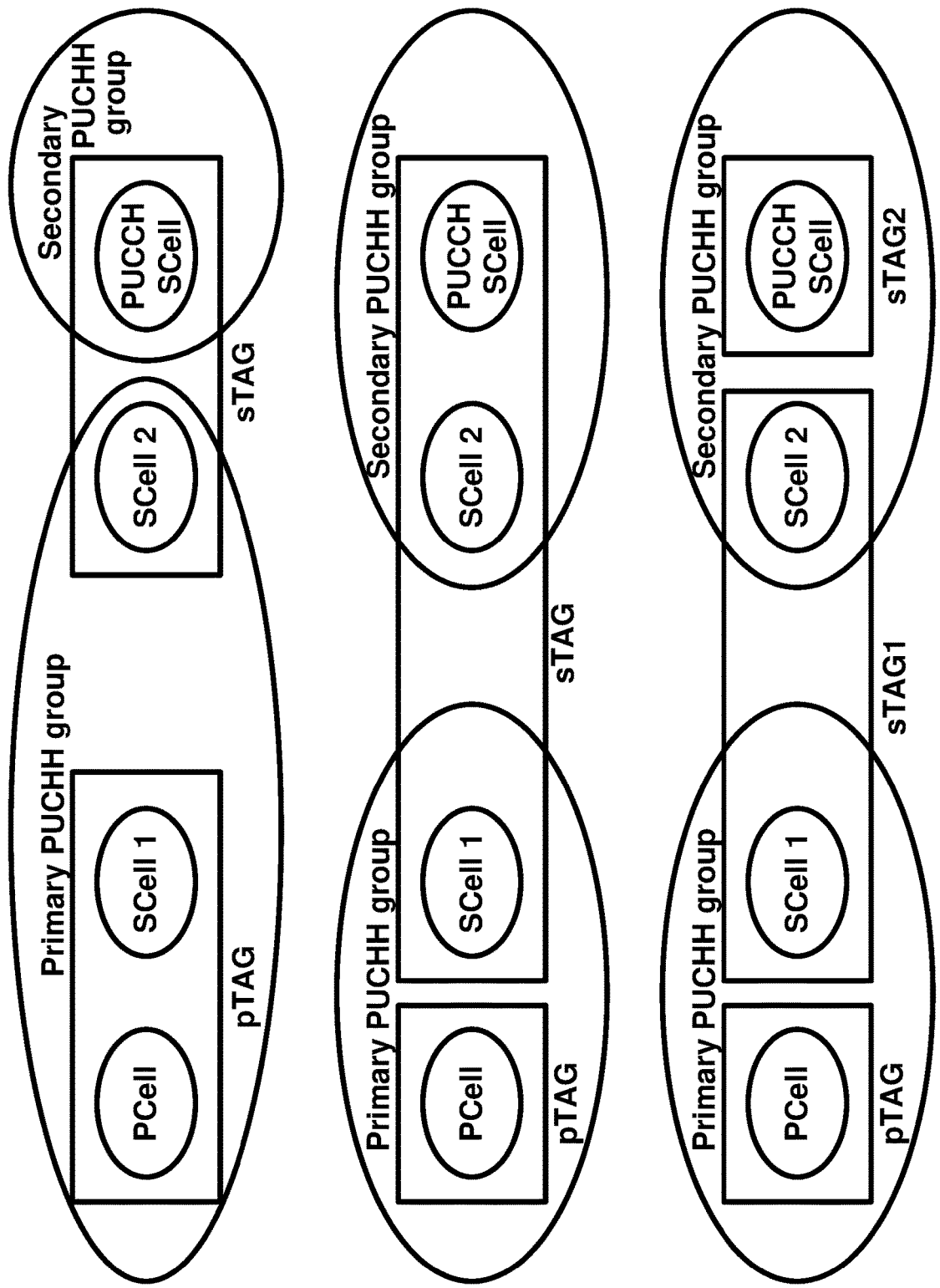
FIG. 12 illustrates example groupings of cells into one or more PUCCH groups and one or more TAGs as per an aspect of an embodiment of the present invention.

In an example embodiment, independent configuration of PUCCH groups and TAGs may be supported. FIG. 11 and FIG. 12 show example configurations of TAGs and PUCCH groups. For example, one TAG may contain multiple serving cells with a PUCCH. For example, each TAG may only comprise cells of one PUCCH group. For example, a TAG may comprise the serving cells (without a PUCCH) which belong to different PUCCH groups.

There may not be a one-to-one mapping between TAGs and PUCCH groups. For example, in a configuration, a PUCCH SCell may belong to primary TAG. In an example implementation, the serving cells of one PUCCH group may be in different TAGs and serving cells of one TAG may be in different PUCCH groups. Configuration of PUCCH groups and TAGs may be left to eNB implementation. In another example implementation, restriction(s) on the configuration of a PUCCH cell may be specified. For example, in an example embodiment, cells in a given PUCCH group may belong to the same TAG. In an example, an sTAG may only comprise cells of one PUCCH group. In an example, one-to-one mapping between TAGs and PUCCH groups may be implemented. In implementation, cell configurations may be limited to some of the examples. In other implementations, some or all the below configurations may be allowed.

In an example embodiment, for an SCell in a pTAG, the timing reference may be a PCell. For an SCell in an sTAG, the timing reference may be any activated SCell in the sTAG. For an SCell (configured with PUCCH or not) in a pTAG, a pathloss reference may be configured to be a PCell or an SIB-2 linked SCell. For an SCell in a sTAG, the pathloss reference may be the SIB-2 linked SCell. When a TAT associated with a pTAG is expired, the TAT associated with sTAGs may be considered as expired. When a TAT of an sTAG containing PUCCH SCell expires, the MAC may indicate to an RRC to release PUCCH resource for the PUCCH group. When the TAT of an sTAG containing a PUCCH SCell is not running, the uplink transmission (PUSCH) for SCells in the secondary PUCCH group not belonging to the sTAG including the PUCCH SCell may not be impacted. The TAT expiry of an sTAG containing a PUCCH SCell may not trigger TAT expiry of other TAGs to which other SCells in the same PUCCH group belong. When the TAT associated with sTAG not containing a PUCCH SCell is not running, the wireless device may stop the uplink transmission for the SCell in the sTAG and may not impact other TAGs.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

Example embodiments of the invention may enable operation of multiple PUCCH groups. Other example embodiments may comprise a non-transitory tangible computer readable media comprising instructions executable by one or more processors to cause operation of PUCCH groups. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of PUCCH groups. The device may include processors, memory, interfaces, and/or the like. Other example embodiments may comprise communication networks comprising devices such as base stations, wireless devices (or user equipment: UE), servers, switches, antennas, and/or the like. In an example embodiment one or more TAGs may be configured along with PUCCH group configuration.

Figure 13:
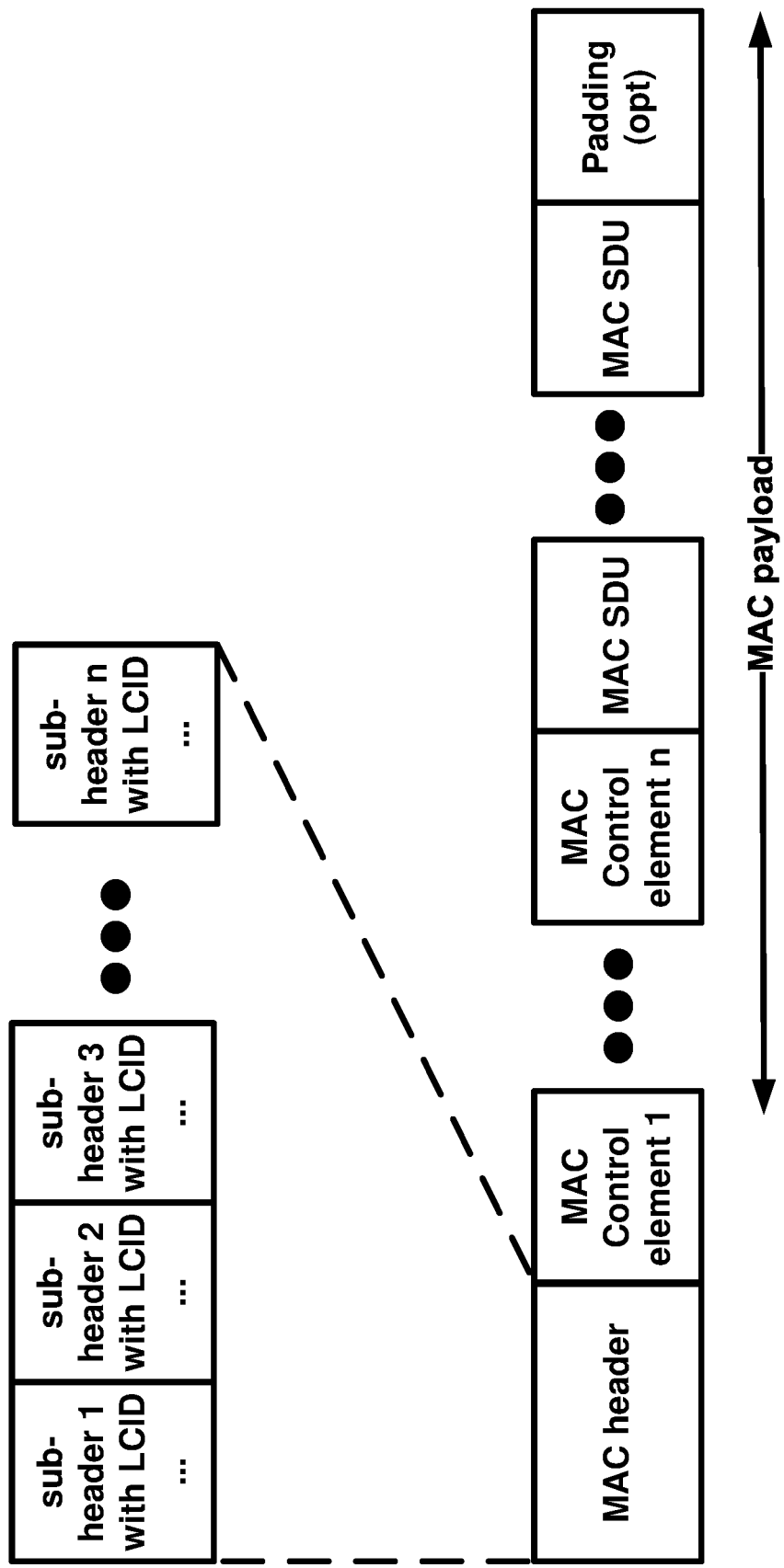
FIG. 13 is an example MAC PDU as per an aspect of an embodiment of the present invention.

FIG. 13 is an example MAC PDU as per an aspect of an embodiment of the present invention. In an example embodiment, a MAC PDU may comprise of a MAC header, zero or more MAC Service Data Units (MAC SDU), zero or more MAC control elements, and optionally padding. The MAC header and the MAC SDUs may be of variable sizes. A MAC PDU header may comprise one or more MAC PDU subheaders. A subheader may correspond to either a MAC SDU, a MAC control element or padding. A MAC PDU subheader may comprise header fields R, F2, E, LCID, F, and/or L. The last subheader in the MAC PDU and subheaders for fixed sized MAC control elements may comprise the four header fields R, F2, E, and/or LCID. A MAC PDU subheader corresponding to padding may comprise the four header fields R, F2, E, and/or LCID.

In an example embodiment, LCID or Logical Channel ID field may identify the logical channel instance of the corresponding MAC SDU or the type of the corresponding MAC control element or padding. There may be one LCID field for a MAC SDU, MAC control element or padding included in the MAC PDU. In addition to that, one or two additional LCID fields may be included in the MAC PDU when single-byte or two-byte padding is required but cannot be achieved by padding at the end of the MAC PDU. The LCID field size may be, e.g. 5 bits. L or the Length field may indicate the length of the corresponding MAC SDU or variable-sized MAC control element in bytes. There may be one L field per MAC PDU subheader except for the last subheader and subheaders corresponding to fixed-sized MAC control elements. The size of the L field may be indicated by the F field and F2 field. The F or the Format field may indicate the size of the Length field. There may be one F field per MAC PDU subheader except for the last subheader and subheaders corresponding to fixed-sized MAC control elements and expect for when F2 is set to 1. The size of the F field may be 1 bit. In an example, if the F field is included, and/or if the size of the MAC SDU or variable-sized MAC control element is less than 128 bytes, the value of the F field is set to 0, otherwise it is set to 1. The F2 or the Format2 field may indicate the size of the Length field. There may be one F2 field per MAC PDU subheader. The size of the F2 field may be 1 bit. In an example, if the size of the MAC SDU or variable-sized MAC control element is larger than 32767 bytes and if the corresponding subheader is not the last subheader, the value of the F2 field may be set to 1, otherwise it is set to 0. The E or the Extension field may be a flag indicating if more fields are present in the MAC header or not. The E field may be set to "1" to indicate another set of at least R/F2/E/LCID fields. The E field may be set to "0" to indicate that either a MAC SDU, a MAC control element or padding starts at the next byte. R or reserved bit, set to "0".

MAC PDU subheaders may have the same order as the corresponding MAC SDUs, MAC control elements and padding. MAC control elements may be placed before any MAC SDU. Padding may occur at the end of the MAC PDU, except when single-byte or two-byte padding is required. Padding may have any value and the MAC entity may ignore it. When padding is performed at the end of the MAC PDU, zero or more padding bytes may be allowed. When single-byte or two-byte padding is required, one or two MAC PDU subheaders corresponding to padding may be placed at the beginning of the MAC PDU before any other MAC PDU subheader. In an example, a maximum of one MAC PDU may be transmitted per TB per MAC entity, a maximum of one MCH MAC PDU can be transmitted per TTI.

At least one RRC message may provide configuration parameters for at least one cell and configuration parameters for PUCCH groups. The information elements in one or more RRC messages may provide mapping between configured cells and PUCCH SCells. Cells may be grouped into a plurality of cell groups and a cell may be assigned to one of the configured PUCCH groups. There may be a one-to-one relationship between PUCCH groups and cells with configured PUCCH resources. At least one RRC message may provide mapping between an SCell and a PUCCH group, and PUCCH configuration on PUCCH SCell.

System information (common parameters) for an SCell may be carried in a RadioResourceConfigCommonSCell in a dedicated RRC message. Some of the PUCCH related information may be included in common information of an SCell (e.g. in the RadioResourceConfigCommonSCell). Dedicated configuration parameters of SCell and PUCCH resources may be configured by dedicated RRC signaling using, for example, RadioResourceConfigDedicatedSCell.

The IE PUCCH-ConfigCommon and IE PUCCH-ConfigDedicated may be used to specify the common and the UE specific PUCCH configuration respectively.

In an example, PUCCH-ConfigCommon may include: deltaPUCCH-Shift: ENUMERATED {ds1, ds2, ds3}; nRB-CQI: INTEGER (0 . . . 98); nCS-AN: INTEGER (0 . . . 7); and/or n1PUCCH-AN: INTEGER (0 . . . 2047). The parameter deltaPUCCH-Shift ($\Delta_{shift}^{PUCCH}$), nRB-CQI ($N_{RB}^{(2)}$), nCS-An ($N_{cs}^{(1)}$), and n1PUCCH-AN ($N_{PUCCH}^{(1)}$) may be physical layer parameters of PUCCH.

PUCCH-ConfigDedicated may be employed. PUCCH-ConfigDedicated may include: ackNackRepetition CHOICE{release: NULL, setup: SEQUENCE {repetitionFactor: ENUMERATED {n2, n4, n6, spare1}, n1PUCCH-AN-Rep: INTEGER (0 . . . 2047)}}, tdd-AckNackFeedbackMode: ENUMERATED {bundling, multiplexing} OPTIONAL}. ackNackRepetitionj parameter indicates whether ACK/NACK repetition is configured. n2 corresponds to repetition factor 2, n4 to 4 for repetitionFactor parameter ($N_{ANRep}$). n1PUCCH-AN-Rep parameter may be $n_{PUCCH,ANRep}^{(1,p)}$ for antenna port P0 and for antenna port P1. dd-AckNackFeedbackMode parameter may indicate one of the TDD ACK/NACK feedback modes used. The value bundling may correspond to use of ACK/NACK bundling whereas, the value multiplexing may correspond to ACK/NACK multiplexing. The same value may apply to both ACK/NACK feedback modes on PUCCH as well as on PUSCH.

The parameter PUCCH-ConfigDedicated may include simultaneous PUCCH-PUSCH parameter indicating whether simultaneous PUCCH and PUSCH transmissions is configured. An E-UTRAN may configure this field for the PCell when the nonContiguousUL-RA-WithinCC-Info is set to supported in the band on which PCell is configured. The E-UTRAN may configure this field for the PSCell when the nonContiguousUL-RA-WithinCC-Info is set to supported in the band on which PSCell is configured. The E-UTRAN may configure this field for the PUCCH SCell when the nonContiguousUL-RA-WithinCC-Info is set to supported in the band on which PUCCH SCell is configured.

A UE may transmit radio capabilities to an eNB to indicate whether UE support the configuration of PUCCH groups. The simultaneous PUCCH-PUSCH in the UE capability message may be applied to both a PCell and an SCell. Simultaneous PUCCH+PUSCH may be configured separately (using separate IEs) for a PCell and a PUCCH SCell. For example, a PCell and a PUCCH SCell may have different or the same configurations related to simultaneous PUCCH+PUSCH.

The eNB may select the PUCCH SCell among current SCells or candidate SCells considering cell loading, carrier quality (e.g. using measurement reports), carrier configuration, and/or other parameters. From a functionality perspective, a PUCCH Cell group management procedure may include a PUCCH Cell group addition, a PUCCH cell group release, a PUCCH cell group change and/or a PUCCH cell group reconfiguration. The PUCCH cell group addition procedure may be used to add a secondary PUCCH cell group (e.g., to add PUCCH SCell and one or more SCells in the secondary PUCCH cell group). In an example embodiment, cells may be released and added employing one or more RRC messages. In another example embodiment, cells may be released employing a first RRC message and then added employing a second RRC messages.

SCells including PUCCH SCell may be in a deactivated state when they are configured. A PUCCH SCell may be activated after an RRC configuration procedure by an activation MAC CE. An eNB may transmit a MAC CE activation command to a UE. The UE may activate an SCell in response to receiving the MAC CE activation command.

In example embodiments, a timer is running once it is started, until it is stopped or until it expires; otherwise it may not be running. A timer can be started if it is not running or restarted if it is running. For example, a timer may be started or restarted from its initial value.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

3GPP TR 36.889 V1.0.1 (2015 June) is a Technical Report published by 3rd Generation Partnership Project, in Technical Specification Group Radio Access Network. 3GPP TR 36.889 is entitled "Study on Licensed-Assisted Access to Unlicensed Spectrum". The purpose of the TR is to document the identified LTE enhancements and corresponding evaluations for a single global solution framework for licensed-assisted access (LAA) to unlicensed spectrum.

3GPP TR 36.889 describes that contention based RA (random access) may not be supported in cells operating in unlicensed bands (LAA cells). Contention free random access may be supported on LAA cells if the eNB decides that RA is needed. If a UE is required to perform LBT (Listen before talk) before UL transmission, the handling of preamble transmission dropping from Rel-12 Dual Connectivity may be used as baseline for preamble dropping on LAA carriers due to LBT failure.

In some example configurations, random access mechanism may not be supported on LAA cells. LAA cells may be small and hence there may not be a need to initiate a RA for uplink synchronization. In some example scenarios, cell radius may be relatively large and random access may be needed. For example, in the lower 5 GHz band there may be a band (e.g. US UNII-1) which may allow up to 4 W EIRP (which may include the antenna gain). And in this band the cells may be relatively large and hence random access may be needed. In an example embodiment, the eNB may decide whether to perform a random access procedure on a cell or whether to skip the random access procedure. The cell may be an LAA cell or a licensed cell.

Implementation of the preamble transmission dropping from Rel-12 Dual Connectivity for preamble dropping on LAA carriers may result in many implementation issues. The behaviors of LAA cells may be unpredictable and implementation of preamble dropping (from Rel-12 Dual Connectivity) in LAA carriers may result in unpredictable results and/or inefficient behaviors in a UE and/or an eNB. There is a need to further improve the UE and/or eNB behavior and improve the random access mechanism for LAA carriers.

In carrier aggregation, a TAG is used to group cells with the same uplink timing. Different TAGs may have different uplink timings. The concept of multiple TAGs may apply when cells in licensed spectrum are deployed. The concept of multiple TAGs may also apply when LAA cells are deployed. In an example embodiment, one or more LAA cells may have a common uplink timing and may be grouped in a TAG. In an example embodiment, one or more LAA cells and one or more licensed cells may be grouped in a TAG depending on the uplink timings. In an example embodiment, licensed cells may be grouped in a TAG depending on uplink timings. In an example deployment scenario, an LAA SCell and a licensed PCell may belong to different timing advance groups (TAGs), for example their antennas may be located on different locations.

Contention free random access may be supported on an LAA SCell to establish uplink synchronization. Random access on an sCell may be initiated with a PDCCH order transmitted by an eNB to a UE. A PDCCH order initiated random access may be supported for an LAA cell. In a RA procedure initiated by PDCCH order on an LAA cell, issues with preamble transmission may be addressed. The Random Access Response (RAR) may be sent on the PCell in carrier aggregation. The RAR (random access response) may be received on a PCell. The PCell may be on a licensed carrier.

In an example embodiment, a UE may not transmit any uplink data and/or signal on an LAA cell if the LAA cell is occupied by other transmitters. Transmissions on an LAA carrier may be subject to LBT requirement and it may be possible that a UE may not be able to perform the dedicated preamble transmission on a PRACH resource opportunity due to unavailability of the channel. A UE may drop transmission of a dedicated preamble on a PRACH opportunity of an LAA SCell due to LBT requirement (when LBT fails). The random access preamble (RAP) transmission may be dropped in the PHY layer when a MAC layer requests for transmission of the RAP (random access preamble), if LBT process fails.

A UE may calculate the power ramping for preambles. In DC, dropping a preamble may not cause additional power ramping, e.g. the UE may not ramp the preamble transmission power when the previous preamble was dropped. The UE may ramp up the power when the preamble is actually transmitted, but not when a preamble is dropped. In DC, the PHY layer may drop RAP transmission in case the UE is power limited. In such a scenario, the PHY may inform the MAC layer of a RAP drop and accordingly, MAC may not increase RA preamble transmission counter and RA preamble transmission power. If the PHY layer in a UE drops the PRACH transmission, the PHY layer may send power ramping suspension indicator to the higher layers (e.g. MAC layer).

In an example embodiment, a wireless device may receive from an eNB a PDCCH order initiating a random access procedure on an LAA cell. The wireless device may start preamble transmission counter at 1. Preamble transmission counter may be for a number of physical layer transmissions of the preamble. In a MAC entity if the notification of power ramping suspension has not been received from lower layers (e.g. PHY layer), the MAC entity may increment preamble transmission counter by 1, otherwise the MAC entity may not increment preamble transmission counter by 1. In a MAC entity, if no Random Access Response is received within the RA Response window, or if none of received random access responses contains a random access preamble identifier corresponding to the transmitted random access preamble, the random access response reception may be considered not successful if the preamble is transmitted a maximum number of times by the physical layer. If preamble transmission counter=preambleTransMax+1 and if the Random Access Preamble is transmitted on an SCell, the UE may consider the Random Access procedure unsuccessfully completed.

In an example embodiment, a PHY layer may indicate to the MAC layer of power ramping suspension when preamble transmission is dropped at the PHY layer on a PRACH opportunity of the LAA SCell due to LBT failure. After receiving such indication MAC layer may not increment the preamble transmission counter, thus avoiding power ramping for the next preamble transmission if it is not dropped. In an example, a PHY layer may indicate to the MAC layer of power ramping suspension when preamble transmission is dropped at the PHY layer due to LBT failure (LBT indicating that the channel is busy). After receiving such indication MAC layer may not increment the preamble transmission counter, thus avoiding power ramping for the next preamble transmission.

The MAC layer may instruct a physical layer to transmit a preamble on a license assisted access (LAA) cell. The physical layer may perform listen-before-talk (LBT) for transmission of the preamble at a preamble transmission opportunity. The physical layer may transmit the preamble if the LBT succeeds, otherwise the physical layer may drop transmission of the preamble. The physical layer may notify the MAC layer, a power ramping suspension indication when the transmission of the preamble is dropped due to a failure of the LBT. When the MAC layer receives a power ramping suspension notification from the physical layer, the MAC layer may not increment the preamble transmission counter, thus avoiding power ramping for the next preamble transmission. Preamble transmission counter may be for a number of physical layer transmissions of the preamble.

In an LAA cell, a UE physical layer may not be able to transmit a RA preamble (RAP) for a long time or any more on an LAA cell when the channel is busy. In this case, the UE MAC may keep transmitting RAP because the preamble transmission counter may not increase and may not reach preambleTransMax for a relatively long period.

The UE physical layer may or may not be able to transmit the dedicated preamble in a next PRACH opportunity on the LAA SCell when the physical layer is instructed by the MAC layer to transmit a preamble. Preamble dropping (e.g. due to LBT) case may be a frequent event in an LAA cell in some scenarios. In an LAA cell, it may be quite frequent that the UE may hold the dedicated preamble allocated by the network for a relatively long time which may not be efficient from resource utilization point of view. Ongoing RA procedure on a busy/occupied LAA cell may cause a delay in acquisition of uplink synchronization and may unnecessarily increase UE battery power and processing power consumption. In an LAA cell, the UE MAC may keep transmitting (e.g. instructing the PHY to transmit) RAP on the LAA cell even if the LAA cell on which the PDCCH order initiated random access is on-going cannot be used for a while. There is a need to consider the random access procedure unsuccessfully completed when the UE is not able to transmit random access preamble on an LAA cell after many attempts.

In an example embodiment, a new counter is introduced. The new counter may be configured to limit a time duration that the preamble is used for the RA procedure on the cell. In an example embodiment, a preamble transmission opportunity counter may be configured in the UE. The preamble transmission opportunity counter may be configured to count the number of preamble transmission attempts in a random access procedure on an LAA cell. The preamble transmission opportunity counter may be configured to count the number of physical layer LBT attempts in a random access procedure on an LAA cell. For example, when a wireless device receives from an eNB a PDCCH order initiating a random access procedure, the wireless device may start preamble transmission opportunity counter. The preamble transmission opportunity counter may be started at 1. The preamble transmission opportunity counter may be incremented at a preamble transmission opportunity when UE MAC layer instructs the PHY layer to transmit a preamble (regardless of LBT fails or succeeds) on an LAA cell. The preamble transmission opportunity counter may indicate the number of preamble transmission attempts by physical layer. A UE may unsuccessfully complete the RA process when the RA preamble transmission opportunity counter expires (e.g. reaches a maximum counter value) when no random access response is received within a random access response window. The preamble transmission opportunity counter may not be needed for licensed cells, since power ramping suspension is expected to be a frequent event in licensed cell. The preamble transmission counter may be a first counter configured to count a number of physical layer transmissions of the preamble. The first counter may be employed for a licensed cell or an LAA cell. The preamble transmission opportunity may be a second counter configured to limit a time duration that the preamble is used for the RA procedure on an LAA cell. Since power suspension notification is not a frequent event on a licensed cell, there is no need to employ the second counter to limit a time duration that the preamble is used for the RA procedure on a licensed cell. This mechanism may simplify the random access process on a licensed cell, and may improve the efficiency of the RA process on an LAA cell.

For a RACH on SCell, if no corresponding random access response is received and if preamble transmission counter is smaller than preambleTransMax+1 and preamble transmission opportunity counter is smaller than preambleTransMax+1 then the UE may proceed to the selection of a random access resource and random access preamble transmission (e.g. in the next RACH resource opportunity).

Figure 14:
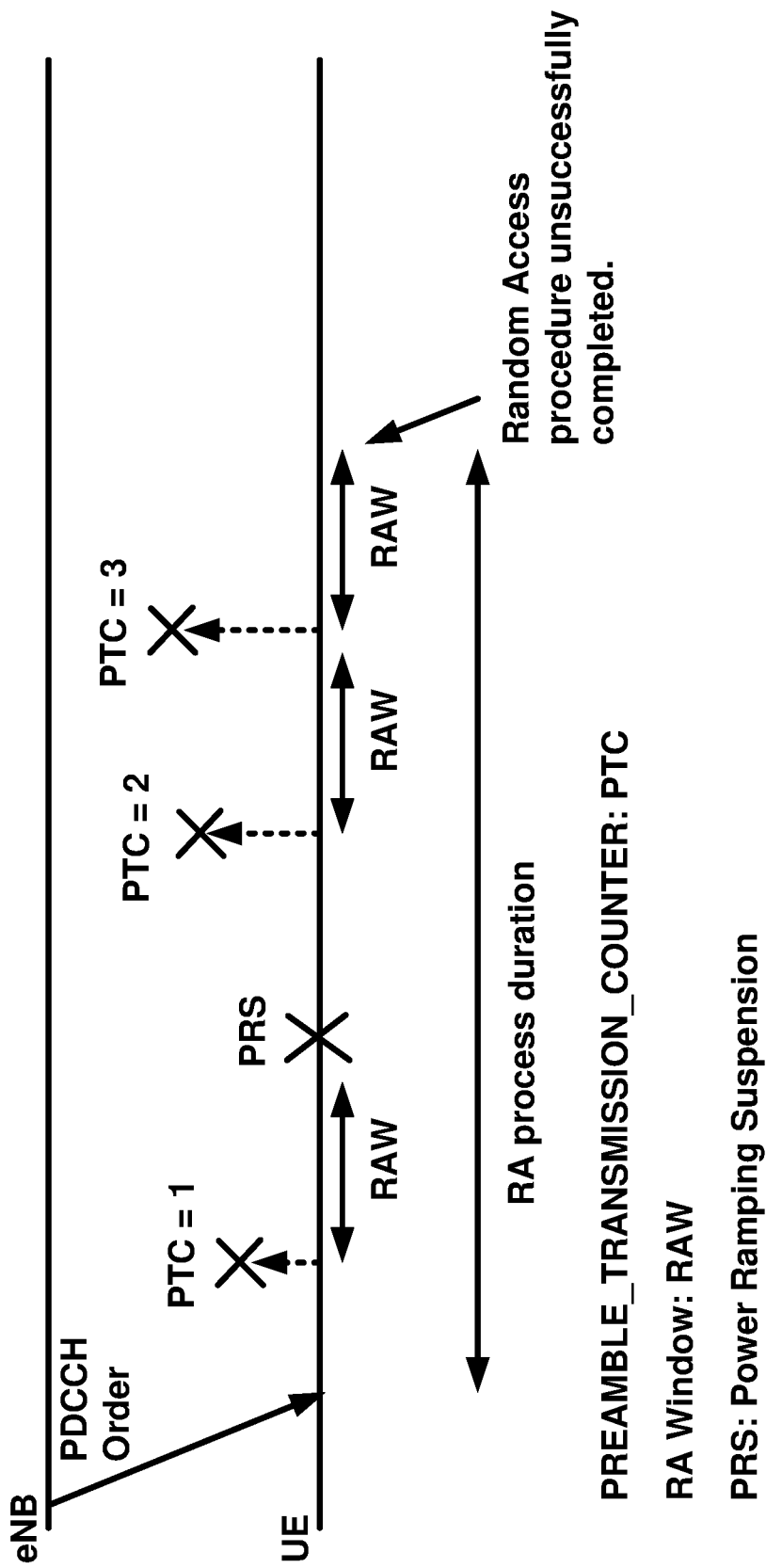
FIG. 14 is an example signal flow of a random access process on a licensed cell as per an aspect of an embodiment of the present invention.

When a random access procedure on an SCell is unsuccessfully completed, the eNB may initiate another RA procedure on another SCell in the sTAG to make the cells in the sTAG uplink synchronized. There may be one random access procedure ongoing at any point in time in a MAC entity. If the MAC entity receives a request for a new random access procedure while another is already ongoing in the MAC entity, it is up to UE implementation whether to continue with the ongoing procedure or start with the new procedure. In an example implementation, a UE may cancel the ongoing process and start with the new procedure FIG. 14 is an example signal flow of a random access process in a licensed cell as per an aspect of an embodiment of the present invention. A UE may transmit the random access preamble on a RACH resource. If no random access response is received within the RA response window, or if none of received random access responses contains a random access preamble identifier corresponding to the transmitted random access preamble, the random access response reception is considered not successful and the MAC entity may increase preamble transmission counter (PTC) by one if the notification of power ramping suspension has not been received from lower layers. In FIG. 14, a notification of power ramping suspension is received in the second preamble transmission opportunity.

If preamble transmission counter is lower than preambleTransMax+1, the UE may proceed to the selection of a Random Access Resource, determination of preamble power employing the PTC, and the transmission of the Random Access Preamble. The UE may transmit RAP for a maximum of preamble transmission counter (e.g. preambleTransMax) and may unsuccessfully complete the process when no corresponding RAR is received.

The eNB may consider the RA preamble released and RA process unsuccessfully completed if during the RA process no preamble is received from the UE. The eNB may start a new RA process on a different cell or may take a different action. In FIG. 14, the UE may terminate a RA process (e.g. after preambleTransMax transmissions=3). The process may limit the UE battery power consumption and preamble holding period.

A MAC entity may maintain a preamble transmission counter for a number of preamble transmissions that has been performed. When this counter reaches a configurable maximum value the UE may consider the random access procedure unsuccessfully completed. The UE may release the preamble. If the cell is LAA, a UE may drop one or more preambles during the random access procedure and may not increase the preamble transmission counter when preamble transmission is dropped. For example, an eNB may configure the UE to send a preamble 8 times the but the UE may drop six of those 8 preamble transmissions. This may result in that the UE employs the preamble 14 times instead of 8. The UE may release the preamble after 14 preamble transmission opportunities rather than the configured 8 times. The eNB may not be able to determine when the preamble becomes available again. In an example scenario, the number of preamble dropping due to LBT failure on an LAA cell may be excessive.

In an example embodiment, a limit may be implemented for how long the UE can use a dedicated preamble on an LAA cell. The dedicated preamble may be used for a limited time regardless of LBT result. This may enable efficiently managing available dedicated RAPs. In order to limit the life time of a dedicated RAP on LAA SCell, a counter or timer other than the preamble transmission counter may be implemented for an LAA SCell.

Figure 15:
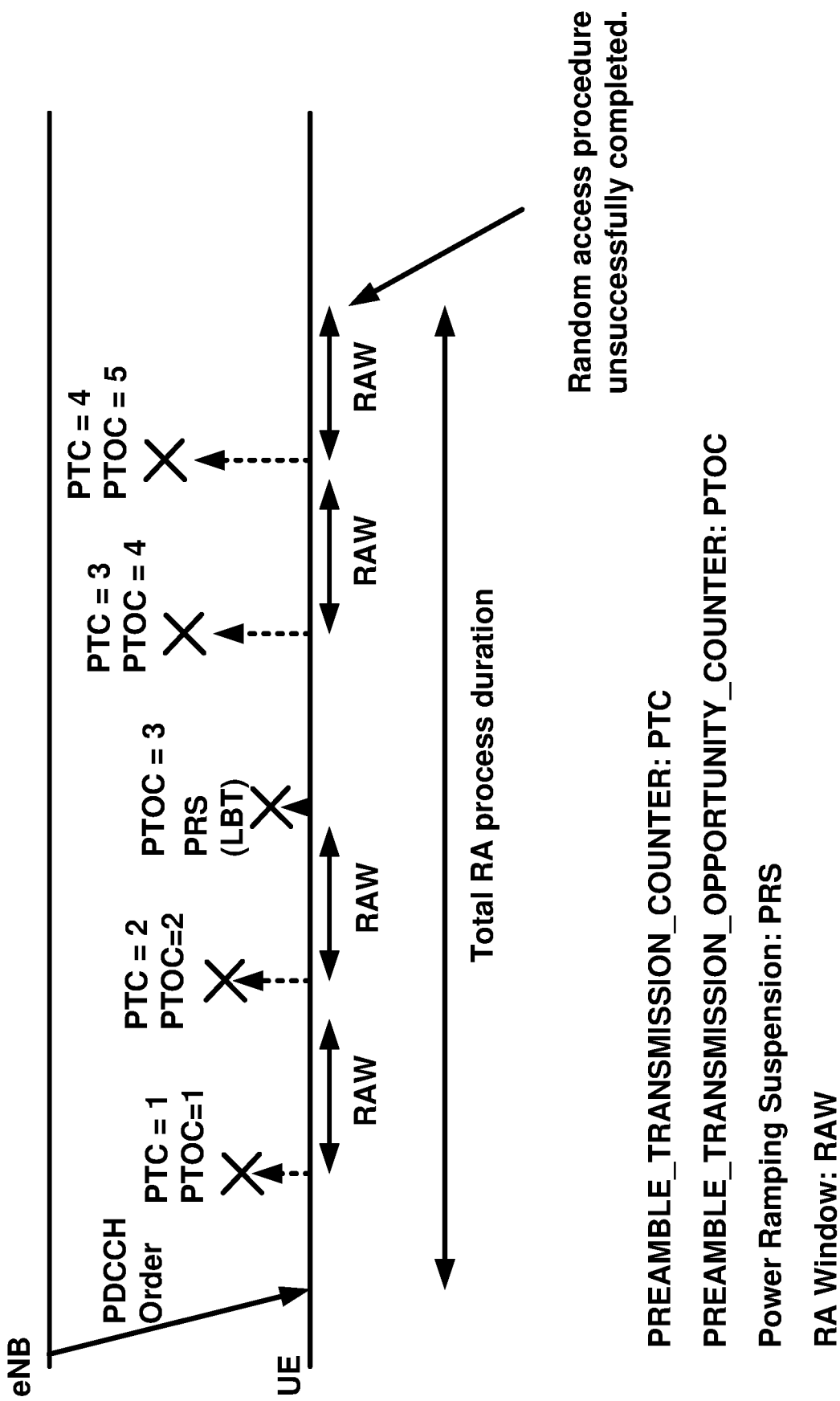
FIG. 15 is an example signal flow of a random access process as per an aspect of an embodiment of the present invention.
Figure 16:
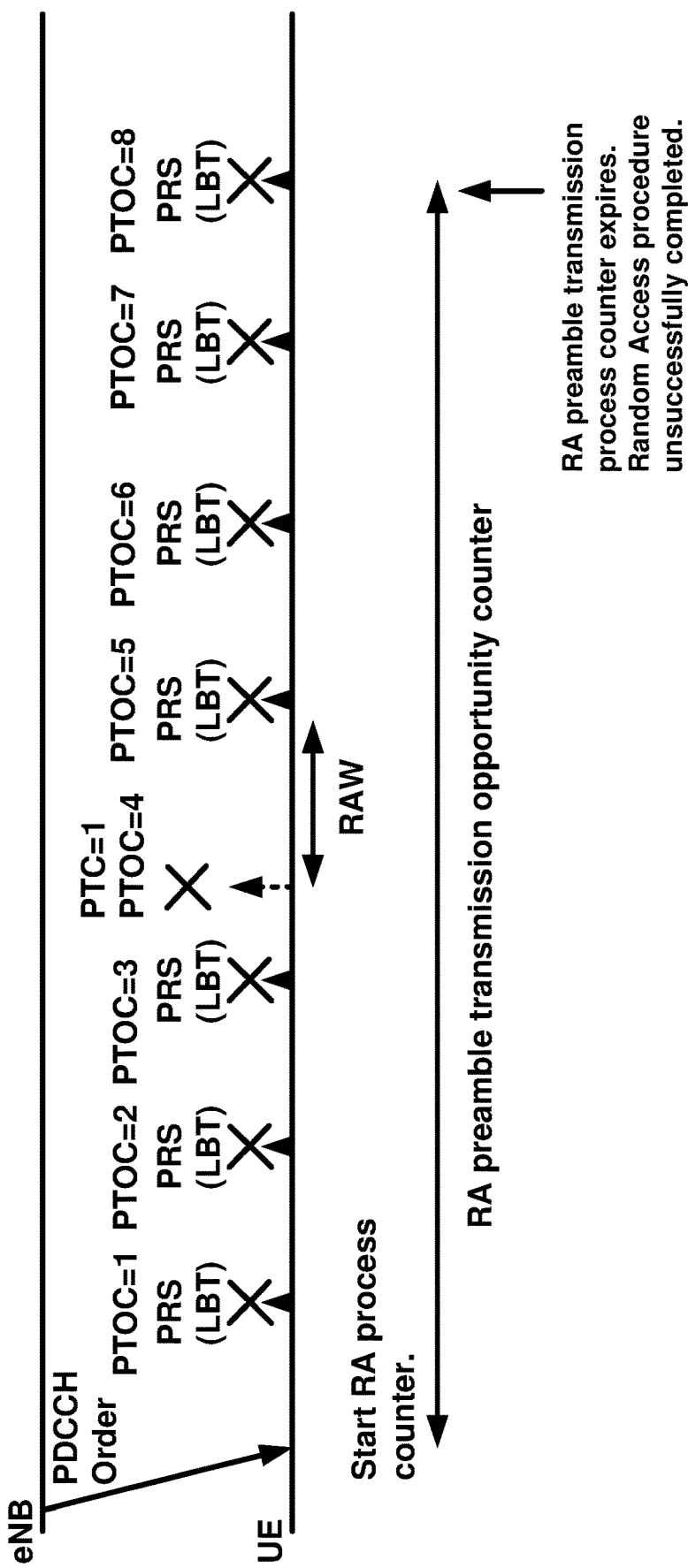
FIG. 16 is an example signal flow of a random access process as per an aspect of an embodiment of the present invention.

FIG. 15 and FIG. 16 are example signal flows of random access process in an LAA cell as per an aspect of an embodiment of the present invention. FIG. 15 and FIG. 16 show example RA processes when power ramping suspension(s) occurs in an LAA cell. FIG. 15 and FIG. 16 show example RA processes on an LAA cell in a busy/congested frequency. The UE may drop one or more preamble transmissions and RA process may take a long and undeterministic period. For example, a UE in a bad coverage quality may not be able to perform preambleTransMax transmissions of the preamble during a relatively long period. This process may unnecessarily consume UE processing and battery power.

In an example embodiment, a new timer may be introduced. In an example embodiment, a preamble transmission process timer may be configured in the UE. For example, a UE may start the timer when it receives a PDDCH order and starts the RA process. A UE may unsuccessfully complete the RA process when the RA process timer expires and the RA process is not successfully completed. The RA process timer may enable that UE terminates/completes the RA process after a limited period of time. In an example embodiment, the maximum preamble transmission process timer and its value may be configured by an RRC message transmitted by an eNB and received by the UE. In an example embodiment, the maximum preamble transmission process timer may have a fixed value which is pre-configured in the UE and eNB.

In an example embodiment, a new counter may be introduced. In an example embodiment, a preamble transmission opportunity counter may be configured in the UE. For example, a UE may start the preamble transmission opportunity counter at 1 when it receives a PDDCH order to start the RA process. The preamble transmission opportunity counter may be started at one. The preamble transmission opportunity counter may incremented when/if the UE MAC entity attempts a preamble transmission by instructing a UE physical layer to transmit the preamble in a random access channel opportunity. A UE may unsuccessfully complete the RA process when the RA preamble transmission opportunity counter expires (e.g. reaches a certain value) and no random access response is received within a random access response window. The preamble transmission opportunity counter may enable that the UE terminates/completes the RA process after a limited number of random access transmission attempts. The new counter may be called by other names, such as, a preamble transmission attempt counter, RA process counter, and/or the like. The new counter is configured to limit a time duration that the preamble is used for the RA procedure on the cell. The MAC entity may maintain a preamble transmission opportunity counter and a preamble transmission counter in a random access procedure.

In an example embodiment, a maximum number of preamble transmissions may be configured by an RRC message transmitted by an eNB and received by the UE. In an example embodiment, the maximum number of preamble transmissions may have a fixed value which is pre-configured in the UE and eNB. The maximum number of preamble transmissions may be configured in terms of RACH transmission opportunities. In an example, maximum number of preamble transmissions may be selected and configured from a limited number of values (3, 10, 20 RACH transmission opportunities). In an example, maximum number of preamble transmissions may be selected and configured from a limited number of values (3, 10, 20 RACH transmission). In example FIG. 14, maximum number of preamble transmissions may be configured as 4. In example FIG. 15, maximum number of preamble transmissions may be configured as 5. In example FIG. 16, maximum number of preamble transmission may be configured as 8.

For example, in FIG. 15, a random access procedure is initiated when an eNB transmits a PDCCH order to a UE for transmission of a preamble on an LAA cell. The UE may start the preamble transmission counter (set the preamble transmission counter to 1). The UE may start the preamble transmission opportunity counter (set the preamble transmission opportunity counter to 1). When a preamble is transmitted and if the notification of power ramping suspension has not been received from lower layers (e.g. due to LBT at the PHY layer), the MAC entity may increment preamble transmission counter by 1. If there has been a preamble transmission attempt by the MAC layer (regardless of LBT being successful or not) the MAC entity may increment preamble transmission opportunity counter by 1. In FIG. 15, the random access procedure is considered unsuccessfully completed after five preamble transmission process attempts. The maximum number of preamble transmissions is configured as five. The physical layer transmits the preamble four times, and the physical layer was not able to transmit the preamble in a transmission opportunity once due to LBT.

For example, in FIG. 16, a random access procedure is initiated when an eNB transmits a PDCCH order to a UE for transmission of a preamble on an LAA cell. The UE may start the preamble transmission counter (set the preamble transmission counter to 1). The UE may start the preamble transmission opportunity counter (set the preamble transmission opportunity counter to 1). When a preamble is transmitted and if the notification of power ramping suspension has not been received from lower layers (e.g. due to LBT at the PHY layer), the MAC entity may increment preamble transmission counter by 1. If there has been a preamble transmission attempt by the MAC layer (regardless of LBT being successful or not) the MAC entity may increment preamble transmission opportunity counter by 1. In FIG. 16, the random access procedure is considered unsuccessfully completed after eight preamble transmission process attempts. The maximum number of preamble transmissions is configured as eight. The physical layer transmitted the preamble once, and the physical layer was not able to transmit the preamble in a transmission opportunity seven times due to LBT.

In a MAC entity and for RA process on an LAA cell, if no Random Access Response is received within the RA Response window, or if none of received Random Access Responses contains a Random Access Preamble identifier corresponding to the transmitted Random Access Preamble, the Random Access Response reception may be considered unsuccessfully completed. In a MAC entity if the notification of power ramping suspension has not been received from lower layers (e.g. PHY layer), the MAC entity may increment preamble transmission counter by 1, otherwise the MAC entity may not increment preamble transmission counter by 1. If preamble transmission counter=preambleTransMax+1 and if the Random Access Preamble is transmitted on an SCell, the UE may consider the Random Access procedure unsuccessfully completed. For a RA process on an LAA cell, the MAC entity may increment preamble transmission opportunity counter by 1 when the MAC entity attempts transmission of the preamble on the LAA cell. If preamble transmission opportunity counter increases a maximum number of preamble transmissions (e.g. equal to maximum PTOC+1), the UE may consider the Random Access procedure unsuccessfully completed. For a RACH on SCell, if preamble transmission counter is smaller than maximum number of preamble transmissions and preamble transmission opportunity counter is smaller than maximum number of preamble transmissions then the ue may proceed to the selection of a random access resource and random access preamble transmission (e.g. in the next RACH resource opportunity). It is clear based on the above description that preamble transmission counter is always less than or equal to the preamble transmission opportunity counter.

In an example embodiment, when the RA preamble transmission opportunity counter expires (exceeds a preconfigured value) and UE does not receive a RAR corresponding to the RAP, the UE considers that the RA process is unsuccessfully completed. In an example, a counter may be used by the eNB. If the eNB does not receive a RAP before the counter expires, the eNB may determine that the RA process is unsuccessfully completed. In an example embodiment, maximum RA preamble transmission opportunity counter may be implemented for LAA cell(s).

In an example embodiment, a maximum RA preamble transmission IE may be employed for configuration of one or more RACHs. In an example embodiment, a maximum RA preamble transmission IE may be configured as a parameter for RA processes employing cells in LAA and/or licensed cells. The preambleTransMax IE may be employed for configuring maximum preamble transmission number for preamble transmission opportunity counter. This process may reduce flexibility in configuring different maximum counter values for a RACH process, and the same value may be used for maximum preamble transmission counter and maximum preamble transmission opportunity counter. This may reduce signaling overhead. With this configuration, a UE may not need to store and/or maintain multiple maximum RA preamble transmission IE values for a cell, and the same maximum value may apply to different RA counters. A maximum counter value may be stored for a random access process regardless of whether the cell is licensed or unlicensed.

In an example embodiment, different cells may have different maximum counter values. At least one RRC message may comprise a first distinct maximum preamble transmission information element for RACH of a first cell and a second distinct maximum preamble transmission information element for a second cell. This process may allow flexibility in configuring maximum preamble transmission values for the first cell and the second cell. This may increase the signaling overhead, and provides a needed flexibility in configuring RA process on different cells. In an example embodiment, at least one RRC message may comprise different maximum values for preamble transmission counter and preamble transmission opportunity counter.

Figure 17:
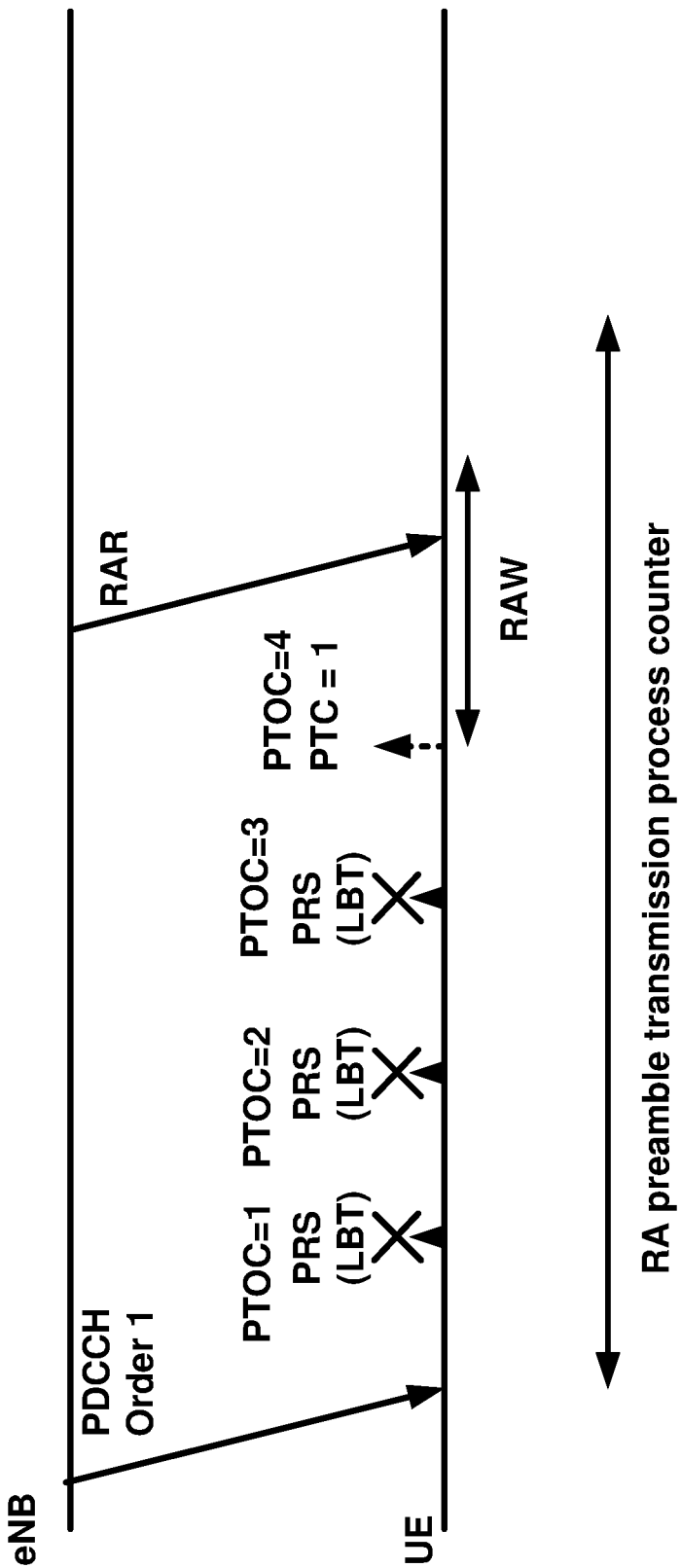
FIG. 17 is an example signal flow of a random access process as per an aspect of an embodiment of the present invention.

FIG. 17 is an example signal flow of a random access process in an LAA cell as per an aspect of an embodiment of the present invention. FIG. 17 shows an example, in which the UE receives a RAR corresponding the transmitted RAP before preamble transmission counter or RA preamble transmission opportunity counter reach a maximum preamble transmission value (expires). In such a scenario, the UE may consider that the RA process is successfully completed.

Figure 18:
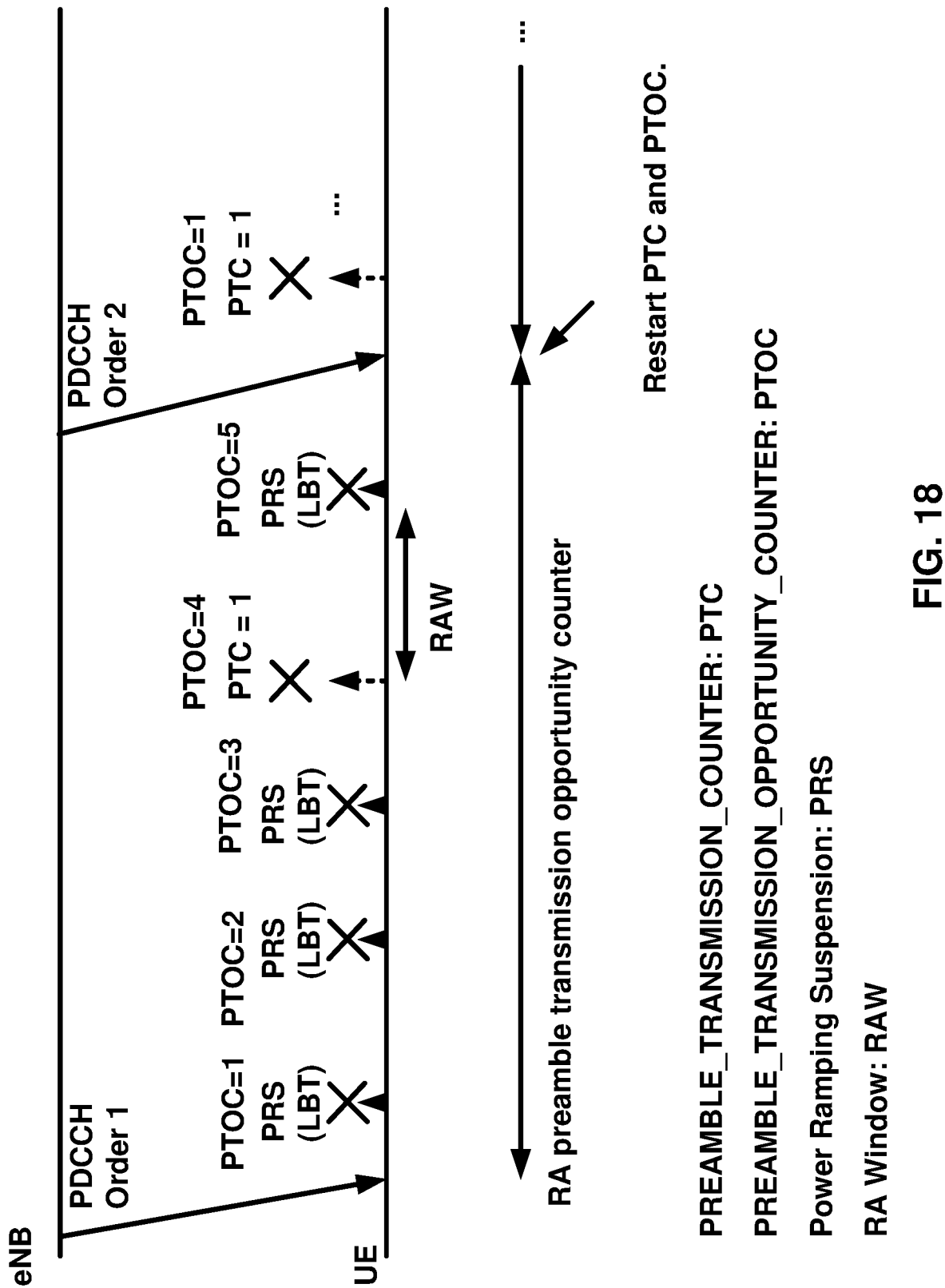
FIG. 18 is an example signal flow of a random access process as per an aspect of an embodiment of the present invention.

FIG. 18 is an example signal flow of a random access process in an LAA cell as per an aspect of an embodiment of the present invention. FIG. 18 shows an example, wherein UE receives a new PDCCH order before the RA preamble transmission opportunity counter expires (e.g. reaches a maximum value) in an ongoing RACH process. The MAC entity in the UE may restart (at 1) the RA preamble transmission opportunity counter and preamble transmission counter when it receives a PDCCH order. The UE may start the new RA process according to the PDCCH order and cancel the ongoing RA process.

The maximum RA preamble transmission opportunity counter may be configured in terms of RACH transmission opportunities (when MAC layer instructs the physical layer and attempts a preamble transmission). For example, maximum RA preamble transmission may be selected and configured from a limited number of values (1, 2, 3, 10, 20 RACH transmission attempts/opportunities). In an example embodiment, a maximum RA preamble transmission may be configured as infinity. This may practically mean that this counter would never expire.

Example embodiments may provide a mechanism for considering a RA process unsuccessfully completed in a UE and/or eNB. This mechanism may prevent or reduce the possibility wherein a UE may stay in a RACH process for a long period and try to transmit a preamble for a long period on a busy/congested frequency. The mechanism may reduce battery and process power consumption in a UE and or an eNB by allowing unsuccessful completion of a RA process.

Figure 19:
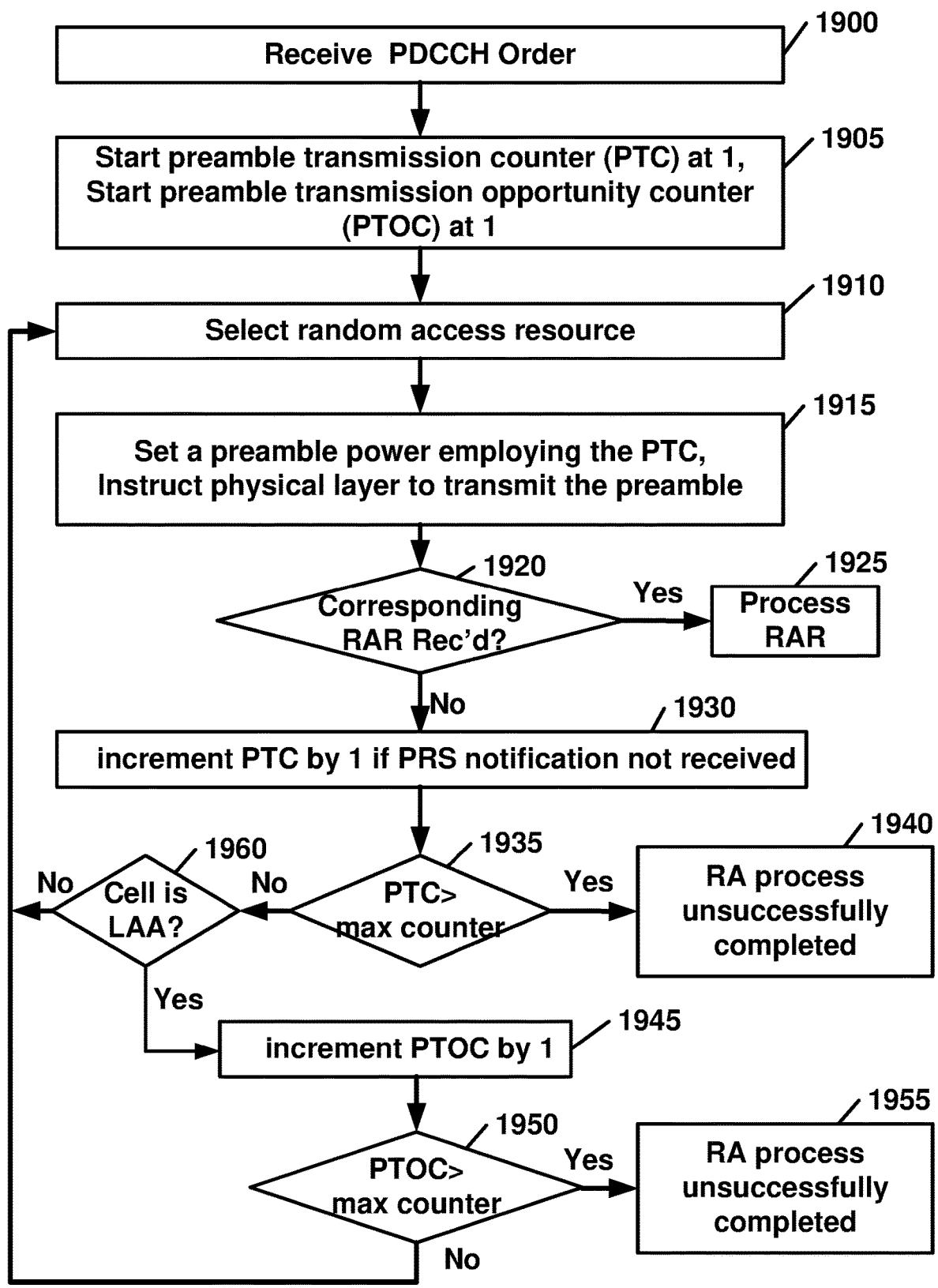
FIG. 19 is an example flow diagram of a random access process as per an aspect of an embodiment of the present invention.

FIG. 19 is an example flow diagram as per an aspect of an embodiment of the present invention. The random access procedure may comprise some of the main steps described here and not all the detailed actions taken by the UE are shown in the flow diagram in FIG. 19. The random access procedure may be initiated by a PDCCH order, by the MAC sublayer itself or by the RRC sublayer. Random Access procedure on an SCell may be initiated by a PDCCH order as shown in block 1900. If a MAC entity receives a PDCCH transmission consistent with a PDCCH order masked with its C-RNTI, and for a specific serving cell, the MAC entity may initiate a random access procedure on this serving cell. For random access on the SpCell a PDCCH order or RRC optionally indicate the ra-PreambleIndex and the ra-PRACH-MaskIndex; and for Random Access on an SCell, the PDCCH order may indicates the ra-PreambleIndex with a value different from 000000 and the ra-PRACH-MaskIndex. For the pTAG preamble transmission on PRACH and reception of a PDCCH order are only supported for SpCell.

Before the procedure can be initiated, at least some of the following information for related Serving Cell may be to be available: the available set of PRACH resources for the transmission of the Random Access Preamble, prach-ConfigIndex; the groups of Random Access Preambles and the set of available Random Access Preambles in a group (e.g for SpCell): The preambles that are contained in Random Access Preambles group A and Random Access Preambles group B are calculated from the parameters numberOfRA-Preambles and sizeOfRA-PreamblesGroupA: If sizeOfRA-PreamblesGroupA is equal to numberOfRA-Preambles then there is no Random Access Preambles group B. The preambles in Random Access Preamble group A are the preambles 0 to sizeOfRA-PreamblesGroupA-1 and, if it exists, the preambles in Random Access Preamble group B are the preambles sizeOfRA-PreamblesGroupA to numberOfRA-Preambles-1 from the set of 64 preambles as defined in. if Random Access Preambles group B exists, the thresholds, messagePowerOffsetGroupB and messageSizeGroupA, the configured UE transmitted power of the Serving Cell performing the Random Access Procedure, PCMAX,c, and the offset between the preamble and Msg3, deltaPreambleMsg3, that are required for selecting one of the two groups of Random Access Preambles (e.g for SpCell). The RA response window size ra-ResponseWindowSize. the power-ramping factor powerRampingStep. the maximum number of preamble transmission preambleTransMax. the initial preamble power preambleInitialReceivedTargetPower. the preamble format based offset DELTA_PREAMBLE. the maximum number of Msg3 HARQ transmissions max-HARQ-Msg3Tx (SpCell only). the Contention Resolution Timer mac-ContentionResolutionTimer (SpCell only). The above parameters may be updated from upper layers before a Random Access procedure is initiated. Other information/parameters may be available as well.

In an example embodiment, the random access procedure may be performed as follows: The UE may flush the Msg3 buffer; set the preamble transmission counter to 1 and set the preamble transmission opportunity counter to 1 (as shown in block 1905); set the backoff parameter value to 0 ms; for the RN, suspend any RN subframe configuration; and proceed to the selection of the Random Access Resource (as shown in block 1910). There may be one Random Access procedure ongoing at any point in time in a MAC entity. In an example, if the MAC entity receives a request for a new random access procedure while another is already ongoing in the MAC entity, the UE may start with the new procedure and cancel the ongoing process.

In an example embodiment, the random access resource selection procedure may be performed as follows: if ra-preambleindex (random access preamble) and ra-PRACH-MaskIndex (PRACH Mask Index) have been explicitly signalled and ra-PreambleIndex is not 000000: the Random Access Preamble and the PRACH Mask Index are those explicitly signalled, else the Random Access Preamble may be selected by the MAC entity as follows: If Msg3 has not yet been transmitted, the MAC entity may: if Random Access Preambles group B exists and if the potential message size (UL data available for transmission plus MAC header and, where required, MAC control elements) is greater than messageSizeGroupA and if the pathloss is less than PCMAX,c (of the Serving Cell performing the Random Access Procedure)-preambleInitialReceivedTargetPower-deltaPreambleMsg3-messagePowerOffsetGroupB, then: select the Random Access Preambles group B; else: select the Random Access Preambles group A, Else, if Msg3 is being retransmitted, the MAC entity may: select the same group of Random Access Preambles as was used for the preamble transmission attempt corresponding to the first transmission of Msg3, randomly select a Random Access Preamble within the selected group; The random function may be such that each of the allowed selections can be chosen with equal probability; and/or set PRACH Mask Index to 0.

In an example embodiment, the UE may determine the next available subframe containing PRACH permitted by the restrictions given by the prach-ConfigIndex, the PRACH mask index and physical layer timing requirements (a MAC entity may take into account the possible occurrence of measurement gaps when determining the next available PRACH subframe); if the transmission mode is TDD and the PRACH mask index is equal to zero: if ra-PreambleIndex was explicitly signalled and it was not 000000 (e.g., not selected by MAC): randomly select, with equal probability, one PRACH from the PRACHs available in the determined subframe, Else: randomly select, with equal probability, one PRACH from the PRACHs available in the determined subframe and the next two consecutive subframes, else: determine a PRACH within the determined subframe in accordance with the requirements of the PRACH Mask Index. The UE may proceed to the transmission of the random access preamble.

In an example embodiment, random Access preamble transmission may be performed as follows: The MAC entity may set PREAMBLE_RECEIVED_TARGET_POWER to preambleInitialReceivedTargetPower+DELTA_PREAMBLE+(PREAMBLE_TRANSMISSION_COUNTER−1)*powerRampingStep; and instruct the physical layer to transmit a preamble using the selected PRACH, corresponding RA-RNTI, preamble index and PREAMBLE_RECEIVED_TARGET_POWER (as shown in block 1915).

In an example embodiment, once the Random Access Preamble is transmitted and regardless of the possible occurrence of a measurement gap, the MAC entity may monitor the PDCCH of the SpCell for Random Access Response(s) identified by the RA-RNTI defined below (as shown in block 1920), in the RA Response window which, e.g, starts at the subframe that contains the end of the preamble transmission plus three subframes and has length ra-ResponseWindowSize subframes. In an example, the RA-RNTI associated with the PRACH in which the Random Access Preamble is transmitted, is computed as: RA-RNTI=1+t_id+10*f_id, where t_id is the index of the first subframe of the specified PRACH ($0 \leq t\_id < 10$), and f_id is the index of the specified PRACH within that subframe, in ascending order of frequency domain ($0 \leq f\_id < 6$). The MAC entity may stop monitoring for random access response(s) after successful reception of a random access response containing random access preamble identifiers that matches the transmitted random access preamble (as shown in block 1925).

In an example embodiment, if a downlink assignment for this TTI has been received on the PDCCH for the RA-RNTI and the received TB is successfully decoded, the MAC entity may regardless of the possible occurrence of a measurement gap: if the Random Access Response contains a Backoff Indicator subheader: set the backoff parameter value as indicated by the BI field of the Backoff Indicator subheader. Else, set the backoff parameter value to 0 ms.

If the Random Access Response contains a Random Access Preamble identifier corresponding to the transmitted Random Access Preamble (in block 1925), the MAC entity may: consider this Random Access Response reception successful and apply the following actions for the serving cell where the Random Access Preamble was transmitted. If ra-PreambleIndex was explicitly signalled and it was not 000000 (e.g., not selected by MAC): consider the Random Access procedure successfully completed.

If no Random Access Response is received within the RA response window, or if none of received Random Access Responses contains a Random Access Preamble identifier corresponding to the transmitted Random Access Preamble, the Random Access Response reception is considered not successful and the MAC entity may: if the notification of power ramping suspension has not been received from lower layers: increment preamble transmission counter by 1 (as shown in block 1930); if preamble transmission counter=preambleTransMax+1 (as shown in block 1935): if the Random Access Preamble is transmitted on the SpCell: indicate a Random Access problem to upper layers; if the Random Access Preamble is transmitted on an SCell: consider the Random Access procedure unsuccessfully completed (as shown in block 1940).

In an example embodiment, if the random access preamble was transmitted on a serving cell operating according to LAA frame structure (LAA cell as shown in block 1960): The UE may increment preamble transmission attempt counter by 1 (as shown in block 1945); if preamble transmission attempt counter=preambleTransMax+1 (as shown in block 1950): consider the Random Access procedure unsuccessfully completed (as shown in block 1955). The UE may proceed to the selection of a random access resource as shown in block 1910.

In an example, blocks 1960, 1945, 1950 and 1955 may be performed before blocks 1930, 1935 and 1940. In an example embodiment, blocks 1960, 1945, 1950 and 1955 and 1930, 1935 and 1940 may be combined together. In an LAA cell, PTOC is greater or equal than PTC. When PTOC is greater than max counter, PTC is also greater than the max counter. When the value of PTOC is smaller than the max counter, PTC is also smaller than the max counter. In an example, for an LAA cell, the blocks 1935 and 1950 may be combined as PTC or PTOC greater than max counter to reduce the number of blocks. Other variations of the flow chart may be implemented to achieve the same results. Some blocks may be combined and/or some blocks could be broken down into sub-blocks.

In an example embodiment, at the completion of the random access procedure, the MAC entity may: discard explicitly signalled ra-PreambleIndex and ra-PRACH-MaskIndex, if any; flush the HARQ buffer used for transmission of the MAC PDU in the Msg3 buffer. In addition, the RN may resume the suspended RN subframe configuration, if any.

The MAC entity may have a configurable timer timeAlignmentTimer per TAG. The timeAlignmentTimer is used to control how long the MAC entity considers the Serving Cells belonging to the associated TAG to be uplink time aligned. The MAC entity may: when a timing advance command MAC control element is received: apply the timing advance command for the indicated TAG; start or restart the timeAlignmentTimer associated with the indicated TAG.

In an example embodiment, when a timing advance command is received in a random access response message for a serving cell belonging to a TAG: if the random access preamble was not selected by the MAC entity: apply the timing advance command for this TAG; start or restart the timeAlignmentTimer associated with this TAG, else, if the timeAlignmentTimer associated with this TAG is not running: apply the timing advance command for this TAG; start the timeAlignmentTimer associated with this TAG; when the contention resolution is considered not successful, stop timeAlignmentTimer associated with this TAG.

In an example embodiment, when a timeAlignmentTimer expires: if the timeAlignmentTimer is associated with the pTAG: flush HARQ buffers for serving cells; notify RRC to release PUCCH/SRS for serving cells; clear any configured downlink assignments and uplink grants; consider running timeAlignmentTimers as expired; else if the timeAlignmentTimer is associated with an sTAG, then for serving cells belonging to this TAG: flush all HARQ buffers; notify RRC to release SRS.

When the MAC entity stops uplink transmissions for an SCell due to the fact that the maximum uplink transmission timing difference or the maximum uplink transmission timing difference the MAC entity can handle between TAGs of this MAC entity is exceeded, the MAC entity considers the timeAlignmentTimer associated with the SCell as expired. The MAC entity may not perform any uplink transmission on a serving cell except the random access preamble transmission when the timeAlignmentTimer associated with the TAG to which this serving cell belongs is not running. When the timeAlignmentTimer associated with the pTAG is not running, the MAC entity may not perform any uplink transmission on any serving cell except the Random Access Preamble transmission on the SpCell. The MAC entity may not perform any sidelink transmission which is performed based on UL timing of the corresponding serving cell and any associated SCI transmissions when the corresponding timeAlignmentTimer is not running. A MAC entity stores or maintains NTA upon expiry of associated timeAlignmentTimer. The MAC entity applies a received timing advance command MAC control element and starts associated timeAlignmentTimer also when the timeAlignmentTimer is not running.

Figure 20:
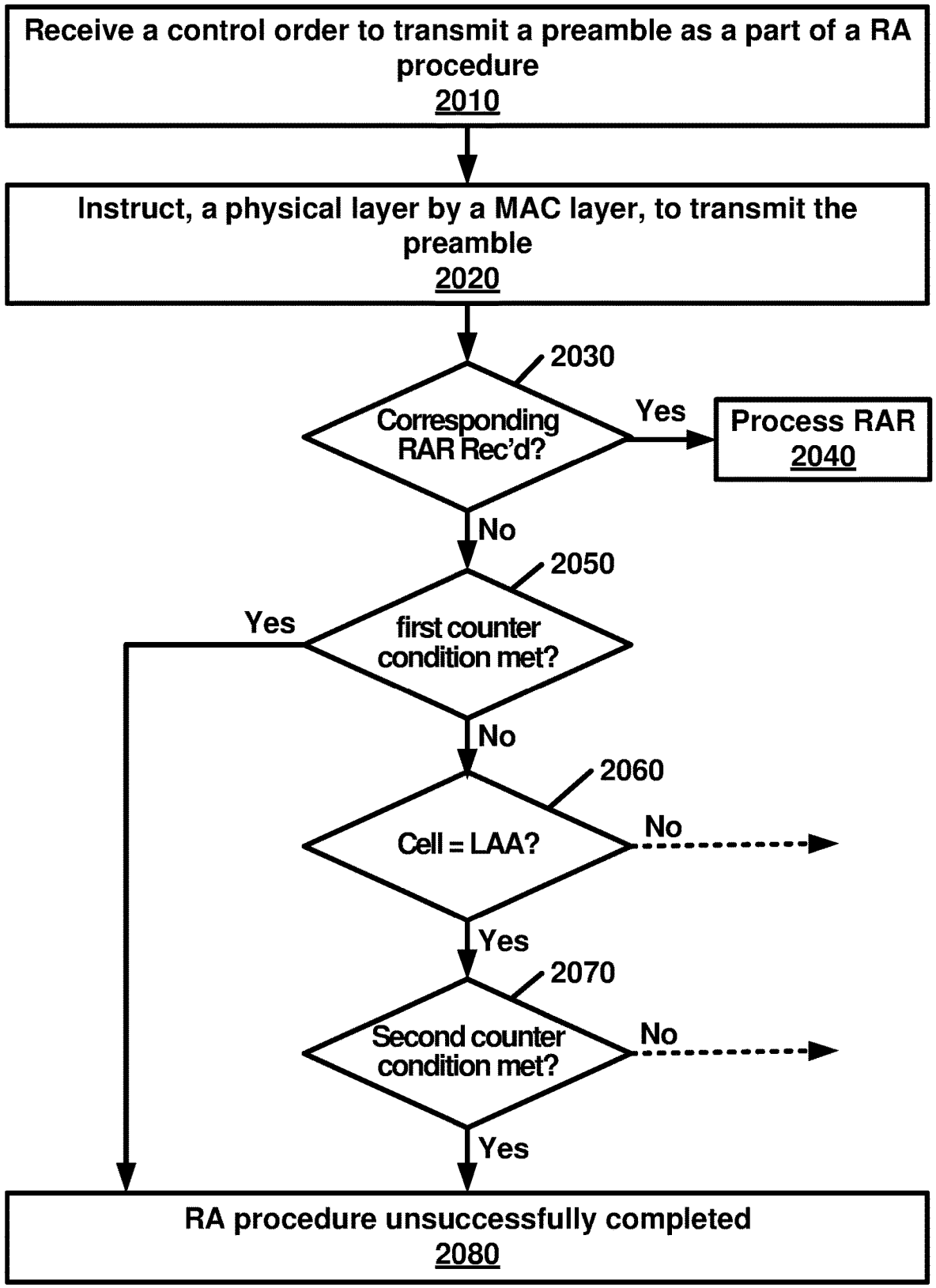
FIG. 20 is an example flow diagram of a random access process as per an aspect of an embodiment of the present invention.

FIG. 20 is an example flow diagram as per an aspect of an embodiment of the present invention. A wireless device may receive a control (e.g. PDCCH) order to transmit a preamble as a part of a random access (RA) procedure on a cell at 2010. According to an embodiment, the control order may comprise a physical downlink control channel (PDCCH) order comprising a preamble index and a random access mask index.

At 2020, the wireless device may instruct, a physical layer by a MAC layer, to transmit the preamble on the cell. At 2030, a determination may be made as to whether a corresponding Random Access Response (RAR) is received in response to a preamble transmission. According to an embodiment, the wireless device may further monitor a downlink channel for the corresponding random access response within a random access response window. The corresponding random access response may comprise a preamble identifier that matches the preamble. If the determination at 2030 is positive, a RAR process may be performed at 2040. According to an embodiment, when the wireless device receives the corresponding random access response, the random access procedure may be considered successfully completed.

A determination may be made as to whether the RA procedure was successfully completed if the determination at 2030 is negative. For example, the RA procedure may be considered to be unsuccessfully completed (2080) if a first condition based on a first counter is met (determined at 2050) regardless of whether the cell is licensed or licensed-assisted-access (LAA). The first counter may be configured to count a number of physical layer transmissions of the preamble. Otherwise, the RA procedure may be considered to be unsuccessfully completed (2080) if a second condition based on a second counter is met (determined at 2070) and the cell is LAA (determined at 2060). The second counter may be employed only if the cell is LAA. The second counter may be configured to limit a time duration that the preamble is used for the RA procedure on the cell.

Not all the detailed mechanisms are shown in the flow diagrams of example embodiments. Other variations of the mechanism may be implemented. For example, when the physical layer does not transmit the preamble and indicate a power ramping suspension, the MAC/PHY layer may not monitor a downlink channel for a corresponding RAR, since the preamble was not transmitted. In an example, first counter and second counter may be processed together, instead of being processed separately. This may reduce the number of tasks, and may result in the same outcome. In an example, the second counter may not be configured or started when the cell is a licensed cell.

According to an embodiment, the wireless device may further set a preamble power parameter employing the first counter. According to an embodiment, the wireless device may further, in response to receiving the control order: start the first counter, and start the second counter.

According to an embodiment, when the cell is LAA, the wireless device may perform, by the physical layer, listen-before-talk (LBT) for transmission of the preamble at a transmission opportunity. If the LBT succeeds, the preamble may be transmitted by the physical layer. Otherwise, transmission of the preamble may be dropped. When the transmission of the preamble is dropped due to a failure of the LBT, a power ramping suspension indication from the physical layer may be received by the MAC layer. According to an embodiment, the wireless device may further comprise: increasing the first counter when the preamble is transmitted by the physical layer; and/or increasing the second counter when the physical layer performs LBT for transmission of the preamble at a transmission opportunity of the preamble.

According to an embodiment, the second counter may be configured to count a number of transmission opportunities/attempts of the preamble in an LAA cell. According to an embodiment, the wireless device may further select random access resources for preamble transmission if, for example: the corresponding random access response is not received; the first condition is not met; and/or the second condition is not met.

According to an embodiment, the wireless device may further consider the first condition met when the first counter reaches a maximum counter value. According to an embodiment, the wireless device may further receive a radio resource control (RRC) message indicating the maximum counter value. According to an embodiment, the wireless device may further consider the second condition met when the second counter reaches the maximum counter value. According to an embodiment, the wireless device may further receive an RRC message indicating the maximum counter value. According to an embodiment, the wireless device may further comprise receiving at least one RRC message comprising, for example: configuration parameters of a plurality of cells comprising the cell; random access resource information elements of a random access channel (RACH) on the cell; a random access response window information element; and/or a maximum RA transmission counter information element.

Figure 21:
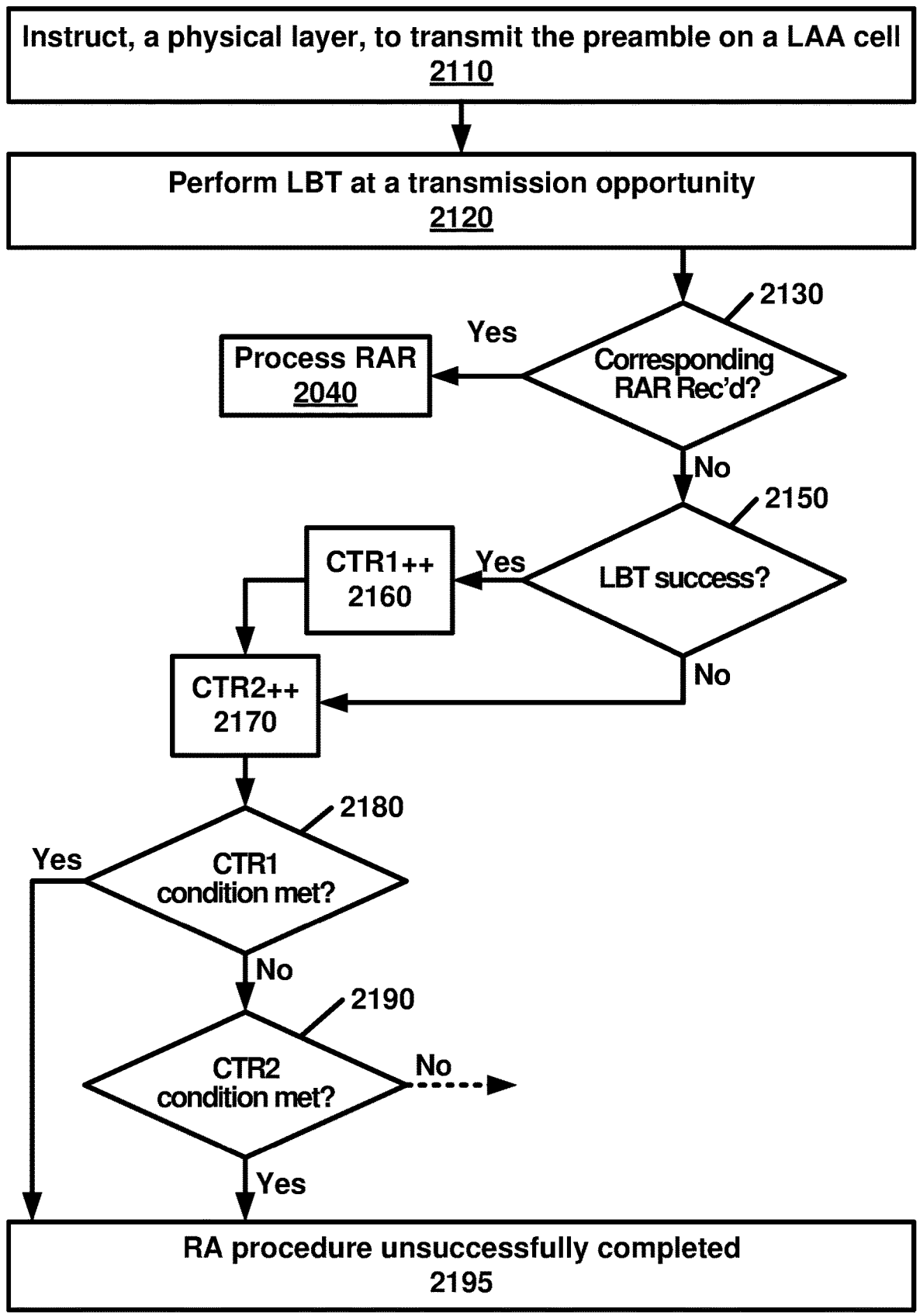
FIG. 21 is an example flow diagram of a random access process as per an aspect of an embodiment of the present invention.

FIG. 21 is an example flow diagram as per an aspect of an embodiment of the present invention. A wireless device may instruct, a physical layer by a MAC layer, to transmit a preamble as a part of a random access (RA) procedure on a licensed assisted access (LAA) cell at 2110. At 2120, an LBT for transmission of the preamble may be performed at a transmission opportunity of the preamble.

At 2130, a determination may be made as to whether a corresponding Random Access Response (RAR) is received in response to a preamble transmission. If the determination at 2130 is positive, a RAR process may be performed at 2140. According to an embodiment, when the wireless device receives the corresponding random access response, the random access procedure may be considered successfully completed.

A determination may be made as to whether the LBT was successfully completed at 2150 if the determination at 2130 is negative. A first counter may be increased (2160) when the LBT is successful. A second counter may be increased (2170) regardless of the success or failure of the LBT. The RA procedure may be considered unsuccessfully completed (2195) if a first condition based on the first counter is met at 2180. Otherwise RA procedure may be considered unsuccessfully completed (2195) if a second condition based on the second counter is met at 2190.

According to an embodiment, the wireless device may further perform, by the physical layer, listen-before-talk (LBT) for transmission of the preamble at a transmission opportunity. According to an embodiment, the wireless device may further transmit, by the physical layer, the preamble if the LBT succeeds, otherwise drop transmission of the preamble. According to an embodiment, the wireless device may further consider the random access procedure successfully completed when the wireless device receives the corresponding random access response. According to an embodiment, the wireless device may further receive a control (e.g. PDCCH) order configured to initiate the random access procedure on the LAA cell, start the first counter in response to receiving the control order, and start the second counter in response to receiving the control order.

A wireless device may comprise one or more processors and memory storing instructions that, when executed, cause the wireless device to perform as series of actions. For example, the instructions may cause the processor to instruct, a physical layer by a MAC layer, to transmit a preamble as a part of a random access (RA) procedure on a licensed assisted access (LAA) cell. The instructions may cause the processor to perform an LBT for transmission of the preamble at a transmission opportunity of the preamble. When a corresponding random access response is not received, the instructions may cause the processor to: increase a first counter when the LBT is successful, increase a second counter regardless of success or failure of the LBT; and consider the RA procedure unsuccessfully completed if a first condition based on the first counter is met, otherwise consider the RA procedure unsuccessfully completed if second a condition based on the second counter is met.

Figure 22:
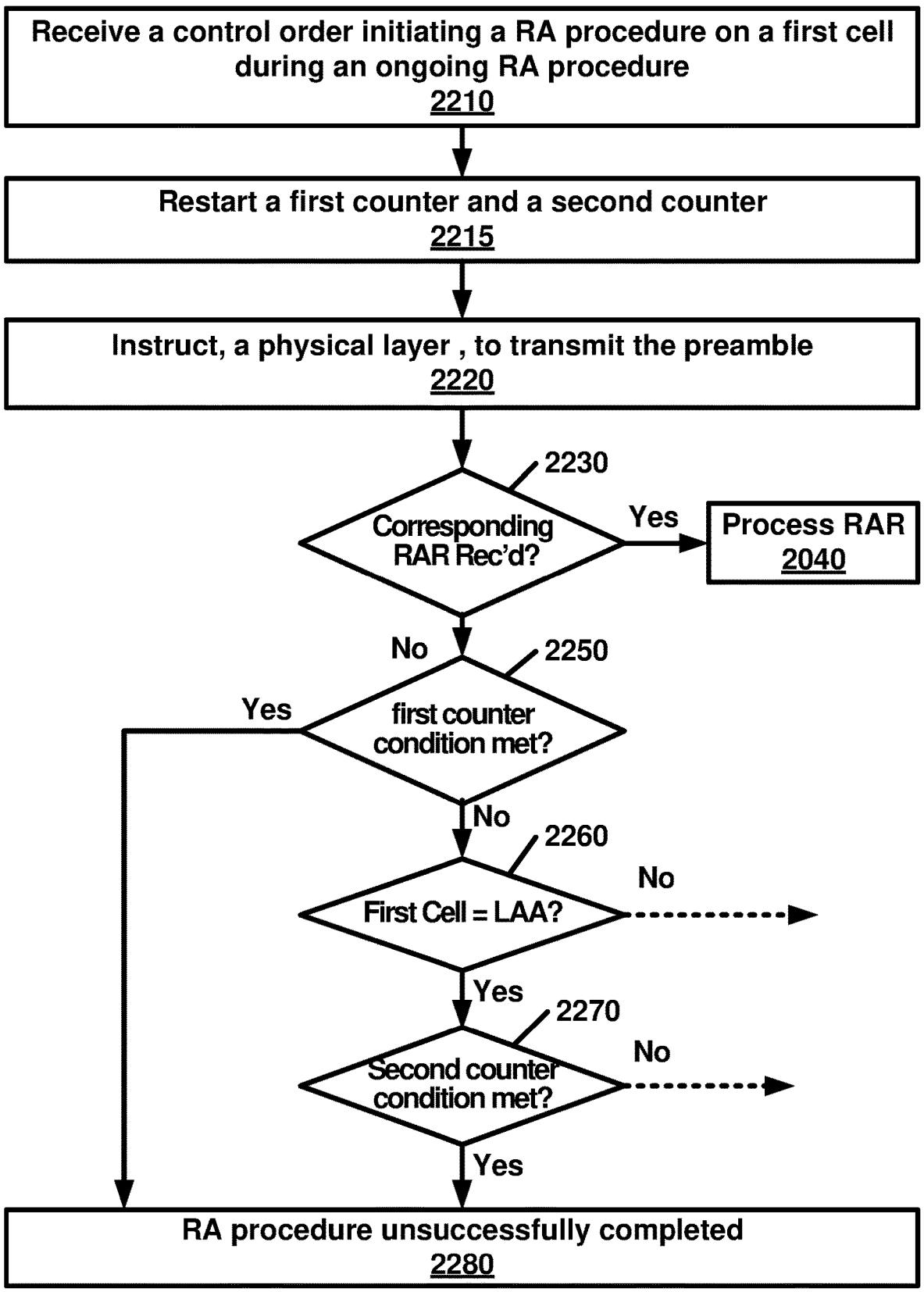
FIG. 22 is an example flow diagram of a random access process as per an aspect of an embodiment of the present invention.

FIG. 22 is an example flow diagram as per an aspect of an embodiment of the present invention. At 2210, a wireless device may receive a control order initiating a random access procedure on a first cell during an ongoing random access procedure on a second cell. According to an embodiment, the control order may be a physical downlink control channel (PDCCH) comprising a preamble index and a random access mask index. According to an embodiment, the first cell may be the same as the second cell. According to an embodiment, the first cell may be different than the second cell.

At 2215, a first counter and a second counter may be restarted. At 2220, the wireless device may instruct, a physical layer by a MAC layer, to transmit the preamble on the first cell. At 2230, a determination may be made as to whether a corresponding Random Access Response (RAR) is received in response to a preamble transmission. If the determination at 2230 is positive, a RAR process may be performed at 2240. According to an embodiment, the wireless device may further monitor a downlink channel for the corresponding random access response within a random access response window. The corresponding random access response may comprise a preamble identifier that matches the preamble.

A determination may be made as to whether the RA procedure was successfully completed at 2250 if the determination at 2230 is negative. The RA procedure may be considered unsuccessfully completed (2280) if a first condition based on the first counter is met at 2250, regardless of whether the first cell is licensed or licensed-assisted-access (LAA). The first counter may be configured to count a number of physical layer transmissions of the preamble. Otherwise, the RA procedure may be considered unsuccessfully completed (2280) if a second condition based on the second counter is met at 2270 and the first cell is LAA (determined at 2260). The second counter may be employed only if the first cell is LAA. The second counter may be configured to limit a time duration that the preamble is used for the RA procedure on an LAA cell.

According to an embodiment, when the first cell is LAA, the wireless device may further perform, by the physical layer, listen-before-talk (LBT) for transmission of the preamble at a transmission opportunity. The preamble may be transmitted by the physical layer if the LBT succeeds. Otherwise, transmission of the preamble may be dropped. The wireless device may receive, by the MAC layer, a power ramping suspension indication from the physical layer when the transmission of the preamble is dropped due to a failure of the LBT.

According to an embodiment, the wireless device may further cancel the ongoing random access procedure. According to an embodiment, the wireless device may further consider the random access procedure successfully completed when the wireless device receives the corresponding random access response.

According to an embodiment, the wireless device may further set a preamble power parameter employing the first counter. According to an embodiment, the second counter may be configured to count a number of transmission opportunities/attempts of the preamble. According to an embodiment, the wireless device may further consider the first condition met when the first counter reaches a maximum counter value. According to an embodiment, the wireless device may further receive a radio resource control (RRC) message indicating the maximum counter value. According to an embodiment, the wireless device may further consider the second condition met when the second counter reaches the maximum counter value. The According to an embodiment, the wireless device may further receive an RRC message indicating the maximum counter value. The first counter may be increased when the preamble is transmitted by the physical layer. The second counter may be increased when the physical layer performs LBT for transmission of the preamble at a transmission opportunity of the preamble on an LAA cell.

According to an embodiment, the wireless device may further select random access resources for preamble transmission if, for example: the corresponding random access response is not received, the first condition is not met, and/or the second condition is not met.

According to an embodiment, the wireless device may further receive at least one RRC message. RRC message(s) may comprise configuration parameters of a plurality of cells comprising the first cell and the second cell. RRC message(s) may comprise random access resource information elements of a random access channel (RACH) on the first cell and the second cell. RRC message(s) may comprise a random access response window information element. RRC message(s) may comprise a maximum RA transmission counter information element.

Figure 23:
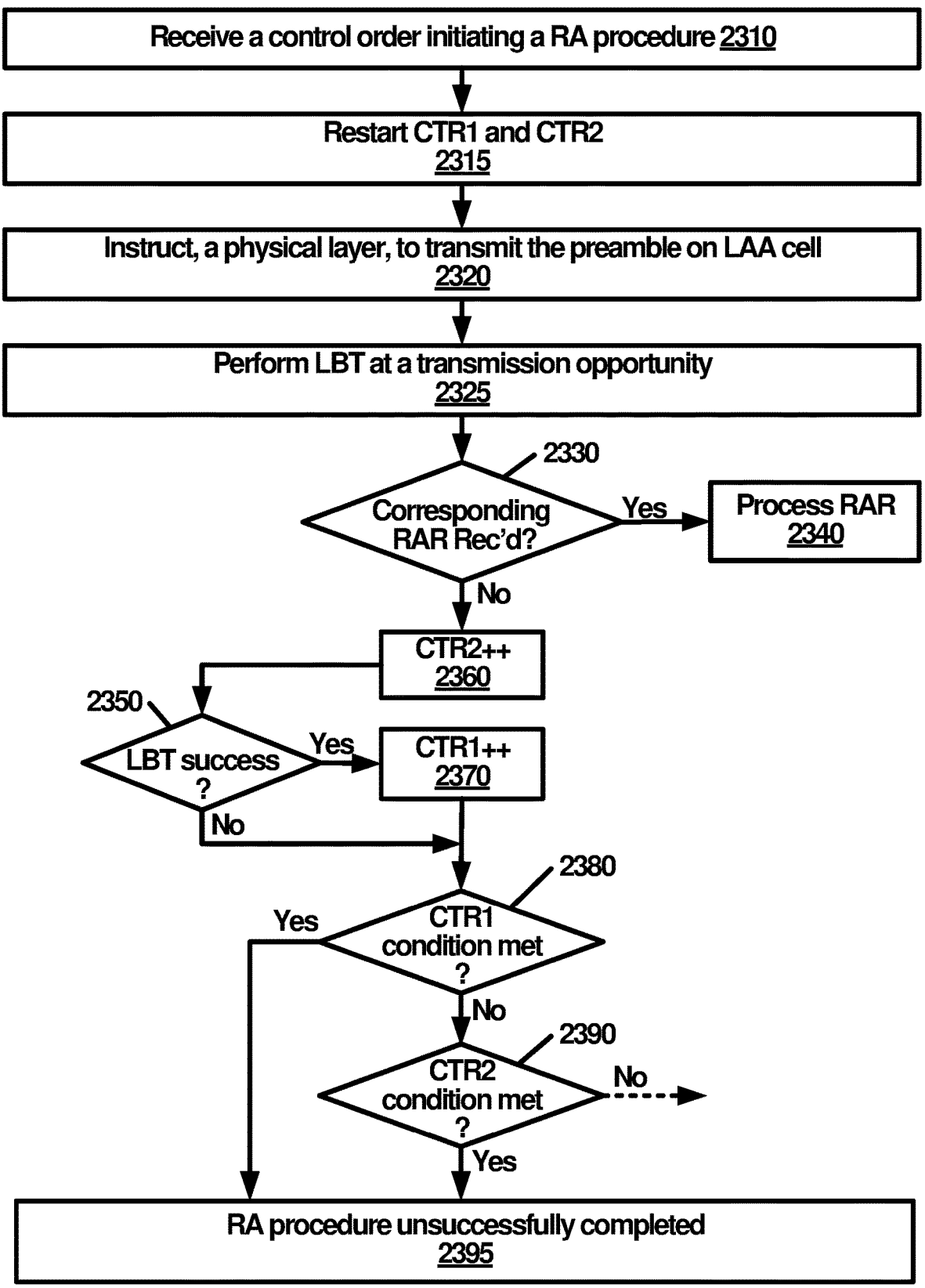
FIG. 23 is an example flow diagram of a random access process as per an aspect of an embodiment of the present invention.

FIG. 23 is an example flow diagram as per an aspect of an embodiment of the present invention. At 2310, a wireless device may receive a control order initiating a random access procedure on a first licensed assisted access (LAA) cell during an ongoing random access procedure on a second LAA cell. At 2315, a first counter and a second counter may be restarted. At 2320, the wireless device may instruct, a physical layer by a MAC layer, to transmit a preamble as a part of a random access (RA) procedure on the first LAA cell. At 2325, an LBT for transmission of the preamble may be performed at a transmission opportunity of the preamble.

At 2330, a determination may be made as to whether a corresponding Random Access Response (RAR) is received in response to a preamble transmission. In an example, if the preamble is not transmitted (e.g. because of LBT failure or power issues) by the physical layer, then the wireless device may not monitor for RAR and may not receive a RAR. If the determination at 2330 is positive, a RAR process may be performed at 2340.

A determination may be made as to whether the LBT was successful 2350 if the determination at 2330 is negative. The first counter may be increased at 2370 when the LBT is successful (determined at 2350). The second counter may be increased at 2360 regardless of success or failure of the LBT.

The RA procedure may be considered unsuccessfully completed at 2395 if a first condition based on the first counter is met at 2380. Otherwise, the RA procedure may be considered unsuccessfully completed at 2395 if a second condition based on the second counter is met at 2390. According to an embodiment, the wireless device may consider the random access procedure successfully completed when the wireless device receives the corresponding random access response.

According to an embodiment, the wireless device may comprise one or more processors and memory storing instructions that, when executed, cause the wireless device to perform a series of actions as described herein.

A TA (timing advance) value may be used by a UE to achieve uplink time alignment so that the received uplink signals are time aligned at the eNB. A TA value indicates to the UE how much it may advance the transmission of the uplink subframe in relation to the reception of the downlink subframe. The UE may, for a random access procedure, assume a TA value of zero. The transmission of the preamble may be advanced in time by zero in relation to the reception of the downlink subframe start, e.g. the preamble may be transmitted upon reception of the start of the downlink subframe.

The eNB may, upon reception of the preamble, calculate the difference in needed uplink reception timing and the actual reception timing of the preamble. This difference may be indicated in the timing advance command (TAC) which is sent to the UE in a random access response message. When the UE has applied the received TAC, the subsequent uplink transmissions may be advanced accordingly. Uplink transmissions may arrive time aligned at the eNB. During the random access procedure the eNB may provide the UE with an initial TA value. This "initial TA value" may in many small cell scenarios be zero.

When multiple TAGs are supported, TAGs including SCell(s) may be configured in addition to the PCell TAG. A random access process may be performed on an SCell of an sTAG. An eNB may transmit a TAC in a RAR to start the TAT of the sTAG and achieve uplink time alignment for serving cells belonging to the sTAG.

Carrier aggregation scenarios containing small cells offered by e.g. femto cells, RRHs and LAA cells may be supported. In some realizations of these scenarios a cell radius of a low power node may be small (e.g. smaller than or around 78 meters, or smaller than around 100 m). Some covered UEs may have a TA value equal to zero.

One TA value-step is 16*Ts which equals around 0.52 µs or about 156 meters propagation distance. The TA value may compensate for the round trip time. In an example embodiment, UEs which are within 78 meters from a node may use a TA value of zero for uplink transmissions to that node. The UE may assume an initial TA value of zero, when a TAG is created. Given that UEs assume an initial TA value of zero also for a newly created TAG the eNB may, instead of ordering a random access procedure, just send a TAC MAC CE with TA value of zero to these UEs. These UEs may not need to perform random access on those SCells to achieve uplink synchronization.

TACs may also be received in a TAC MAC CE. The UE may assume an initial TA value of zero. The eNB may have the possibility to trigger start of a UE TAT with a TAC MAC CE containing zero. The UE may start the associated TAT without the need to perform a random access procedure. RACH load, latency and the possibility of random access failure may be reduced. When a random access procedure is not performed, it may be possible to reduce the number of serving cells which needs to be configured with RACH resources. In an example embodiment, RACH resources may not be configured for any serving cell in an sTAG and a UE may employ TAC MAC CE to adjust UE uplink transmission timings.

It may be up to the eNB to determine whether a UE may use a random access process or not. A TAC MAC CE may start the TAT and uplink synchronize the TAG. Upon configuration of a new TAG, the UE may initiate the associated TA value to zero. To obtain initial UL time alignment for an sTAG, an eNB may initiate a random access procedure or may transmit a TAC MAC CE.

A UE may save the TA value upon expiry of associated TAT. A received TAC MAC CE may be applied by the UE when the associated TAT is not running. The eNB may send a TAC MAC CE (e.g. with value zero) to start the TAT and avoid an unnecessary random access procedure. An eNB may perform this when the eNB wants to get a UE UL synchronized in a certain TAG after expiry of the corresponding TAT. This mechanism may reduce RACH load, uplink transmission delay and possibility of RA failure.

In an example embodiment, a UE may be able to reuse a stored TA value even though the associated TAT has expired. For example, a UE moving with a speed of 6 km/h and a TAT value of 20.48 seconds may move less than 36 meters from that the UE has started/restarted the TAT before it expires. A TA value has the span of around 78 meters which means that the TA value maintained by the UE is most probably valid for a long time after TAT expiry. The eNB may, if it determines suitable, restart such a TAT by a TAC MAC CE instead of ordering a random access procedure.

An eNB may transmit an RRC reconfiguration message to configure a TAG. The eNB may receive an RRC reconfiguration complete message confirming that RRC reconfiguration message is received. The eNB may send a MAC activation command to activate an SCell in the TAG. The eNB may send a TAC MAC CE starting the TAT associated with the new TAG to start the corresponding TAT. This process may introduce unnecessary delays. The transmission of the TAC MAC CE may be an unnecessary overhead. In an example embodiment, when a TAG is created, the initial TA value of zero may be suitable and it may be unnecessary for the eNB to transmit a TAC MAC CE to the UE or to initiate a RA process to start the associated TAT.

When the TAT of an sTAG is expired, transmission of a MAC CE (e.g. with TA value of zero) or initiation of a RA process may be an unnecessary overhead to start the TA timer. The UE may be able to start uplink transmission with the stored TA whenever it is needed. Existing mechanisms may introduce an unnecessarily slow and suboptimal TA handling mechanism and may introduce unnecessary additional overhead. There is a need to further improve the existing uplink time alignment process. Some example embodiments of the invention introduce improved mechanisms for uplink time alignment.

In an example embodiment, an eNB may configure the TAT IE to have a first value of infinity (or equally as disabled). The eNB may transmit an RRC message comprising a TAT IE for a TAG indicating the first value. When an eNB configures the TAT IE of a TAG as the first value (infinity or disabled), the eNB may indicate that the TAG is uplink synchronized as long as the TAG is configured. In such a scenario, the eNB may not need to start a RA process or transmit a MAC TA CE to start the TAT of the TAG. This is equivalent to a situation wherein the TAT of the sTAG is always running when sTAG is configured and does not expire. Equally, this may imply that the TAT is disabled, and the UE does not consider processes corresponding to a TAT for this TAG.

In this scenario, a UE may start SRS, PUCCH, and/or data transmission on the SCell of the TAG as soon as the SCell is activated. The UE may apply the TA value of zero for the initial transmission. The eNB may, upon reception of the uplink signals, calculate the difference in needed uplink reception timing and the actual reception timing of the uplink signals. This difference may be indicated in the Timing Advance Command (TAC) which is sent to the UE. If the network considers the TA value of zero is not accurate enough, the eNB may adjust the TA via a TA command after the first uplink transmission. The UE stores the last updated value of the TA and may use it for the next transmission. For example, when an SCell is deactivated and then activated after a while, the UE may use the stored value of the TA for uplink transmission when the SCell is activated. When a UE received a MAC TA CE, the UE may apply a TA in the received MAC CE to the stored TA value.

The example embodiment may not require any additional signaling mechanism by RRC messages. Existing related RRC signaling for TAT and TAG configuration may be employed. The UE may process the RRC message differently compared with the existing mechanisms. When the TAT IE value indicates infinity (as in existing mechanism), the UE may consider that the TAT IE value indicates that the TAT is disabled. The UE may not need to receive a specific message or command to start the TAT of the TAG. No additional field is added to the RRC message for this mechanism. This mechanism may not increase RRC signaling overhead, may reduce MAC signaling overhead and provide an enhanced mechanism with reduced uplink transmission delay. Equally, one may assume that when the TAT IE value indicates infinity (as in existing mechanism), the UE may start the TAT of the sTAG when the sTAG is configured and the TAT does not expire as long as the TAG is configured.

In the current uplink time alignment mechanism, the IE TimeAlignmentTimer may be used to control how long the UE considers the serving cells belonging to the associated TAG to be uplink time aligned. The value of the IE TimeAlignmentTimer may be in number of sub-frames. For example, a value of sf500 corresponds to 500 sub-frames; sf750 corresponds to 750 sub-frames and so on. TimeAlignmentTimer::=ENUMERATED {sf500, sf750, sf1280, sf1920, sf2560, sf5120, sf10240, infinity}.

In existing mechanisms, the eNB may need to initiate a RA process or transmit a MAC CE for the sTAG no matter what the value of the IE TimeAlignmentTimer is. In an example embodiment, when the value of IE TimeAlignmentTimer is set to infinity/disabled, there is no need for starting a RA process or transmitting a MAC CE after a TAG is configured to enable uplink transmission. For example in such a case, the time alignment timer for sTAG may not be configured, and the sTAG may be considered time aligned after the configuration.

In an example embodiment, when the timeAlignmentTimer associated with the pTAG is not running, the MAC entity may not perform any uplink transmission on any Serving Cell except the Random Access Preamble transmission on the SpCell.

In an example embodiment, when the IE TimeAlignmentTimer is configured with one of the other values {sf500, sf750, sf1280, sf1920, sf2560, sf5120, sf10240}, legacy procedures may be implemented. The UE may not transmit any uplink signals when TAT is expired or when TAT is not running. For example, when TAG is configured and the corresponding TAT is not running, the eNB may need to initiate a RA process or transmit a MAC CE to start the TAT of the TAG. When the TAT associated with an sTAG expires, then for Serving Cells belonging to this TAG: UE may flush HARQ buffers, the UE may notify RRC to release SRS, and/or the UE may notify RRC to release PUCCH. To start TAT of the TAG, the eNB may transmit one or more RRC messages to reconfigure SRS and/or PUCCH resources. The UE may transmit MAC TA CE or initiate a RA process to restart the TAT.

The MAC entity may not perform any uplink transmission on a Serving Cell except the Random Access Preamble transmission when the TAT associated with the TAG to which this Serving Cell belongs is not running (and TAT is not disabled). A MAC entity may store or maintain NTA upon expiry of associated TAT. The MAC entity may apply a received TAC MAC CE and may start associated TAT when the TAT is not running or when the TAT is running.

In an example embodiment, an RRC message may comprise an IE indicating that TAT of an sTAG is disabled. The IE indicating that TAT of an sTAG is disabled or enabled may be different from the IE TimeAlignmentTimer. For example the RRC message may comprise a TAG index IE and a TAT_disabled (or any other name) IE indicating that the TAT of a TAG identified by the TAG index IE is disabled. For example, the IE STAG-ToAddMod-r11::=SEQUENCE {stag-Id-r11 STAG-Id-r11, timeAlignmentTimerSTAG-r11 TimeAlignmentTimer, . . . } may further include a timeAlignmentTimerSTAG IE indicating whether TimeAlignmentTimer of the sTAG is disabled. In that case, the time alignment timer for sTAG may not be configured, and the sTAG may be considered time aligned after the configuration. The example embodiment may provide more flexibility in configuring TAT of a TAG, but requires an additional field in the RRC message.

When TAT timer of an sTAG is disabled, the eNB may not need to transmit a timing advance command to start a TAT of the sTAG. A UE may start SRS, PUCCH, and/or data transmission on the SCell of the TAG as soon as the SCell is activated. A UE may apply the TA value of zero for the initial transmission. If the network considers the TA value of zero is not accurate enough, the eNB may adjust the TA via a TA command after the first uplink transmission. The UE stores the last updated value of the TA and may use it for the next transmission. For example, when an SCell is deactivated and then activated after a while, the UE may use the stored value of the TA for uplink transmission when the SCell is activated. When a UE receives a MAC TA CE, the UE may apply a TA in the received MAC CE to the stored TA value.

In an example embodiment, a wireless device may receive at least one message comprising: configuration parameters of a plurality of cells comprising a primary cell and at least one secondary cell; a timing advance group (TAG) index information element (IE) identifying a TAG; and/or a time alignment timer (TAT) IE associated with the TAG. A value of the TAT IE may be selected from a finite set of predetermined values comprising: a first value in terms of sub-frames; and a second value. If the TAT IE indicates the first value, the wireless device may transmit uplink signals on a secondary cell in the TAG only after receiving a timing advance command. If the TAT IE indicates the second value, the wireless device may transmit uplink signals on a the secondary cell in the TAG without the need for receiving a timing advance command.

In an example embodiment, a wireless device may receive at least one message comprising: a timing advance group (TAG) index information element (IE) identifying a TAG; and/or a time alignment timer (TAT) IE associated with the TAG. A value of the TAT IE may be selected from a finite set of predetermined values comprising: a first value; and a second value. If the TAT IE indicates the first value, the wireless device may transmit uplink signals on a secondary cell in the TAG only after receiving a timing advance command. If the TAT IE indicates the second value, the wireless device may transmit uplink signals on a the secondary cell in the TAG without the need for receiving a timing advance command.

In an example embodiment, the wireless device may receive at least one message comprising: configuration parameters of a plurality of cells comprising a primary cell and at least one secondary cell; a timing advance group (TAG) index information element (IE) identifying a TAG; and/or one or more time alignment timer (TAT) IEs associated with the TAG. The one or more TAT IEs indicating at least one of: a value of the TAT IE; a TAT of the TAG is disabled. If the TAT IE indicates the value, then the wireless device may transmit uplink signals on a secondary cell in the TAG only after receiving a timing advance command. If the TAT IE indicates that the TAG is disabled, then the wireless device may transmit uplink signals on the secondary cell in the TAG without the need for receiving a timing advance command.

In an example embodiment, the wireless device may receive at least one message comprising: a timing advance group (TAG) index information element (IE) identifying a TAG; and/or one or more time alignment timer (TAT) IEs associated with the TAG. The one or more TAT IEs may indicate at least one of: a value of the TAT IE; a TAT of the TAG is disabled. If the TAT IE indicates the value, the wireless device may transmit uplink signals on a secondary cell in the TAG only after receiving a timing advance command. If the TAT IE indicates that the TAG is disabled, the wireless device may transmit uplink signals on the secondary cell in the TAG without the need for receiving a timing advance command.

In an example embodiment, there may be a need to improve TAT process when TAT is configured with one of the values in the legacy system. TimeAlignmentTimer::=ENUMERATED {sf500, sf750, sf1280, sf1920, sf2560, sf5120, sf10240, infinity}.

The TAT of a TAG may start or restart when a UE receives a TAC. In an example embodiment, a UE may transmit uplink signals when TAT is not running employing a TA value. In an example, the TAT may not be running upon TAG configuration. In an example, the TAT may not be running upon TAT expiration. For example, a UE may transmit uplink signals (e.g. SRS, PUCCH, and/or data) with a TA value of zero when TAT is not running. In an example embodiment, a UE may transmit uplink signals (e.g. SRS, PUCCH, and/or data) with a previously stored TA value when TAT is not running. The stored value of the TA value for an initial uplink transmission after TAG configuration may be zero. A UE may store the most recently updated value of the TA of a TAG when the TAT of the TAG is expired. A UE may start or restart TAT when the UE receives a TAC including a TA value from the eNB (as a part of RA process or TAC MAC CE). In an example implementation, an eNB may transmit one or more RRC messages comprising an IE for a TAG to indicate this configuration. The RRC configuration for a TAG may comprise one or more IE indicating that UE may transmit uplink signals to an eNB when a corresponding TAT of the TAG is not running. Example embodiments may reduce unnecessary MAC overhead and reduce uplink transmission delays when a TAT of an sTAG is not running.

The TAT of a TAG may start or restart when a UE receives a TAC. In an example embodiment, other trigger conditions may be defined to start or restart a TAT of a configured TAG. For example, the eNB may configure a UE to start the associated TAT at TAG creation (when TAG is configured using RRC messages). In an example embodiment, the eNB may determine if the TAG has a suitable TA value. The eNB may transmit at least one RRC message to the UE indicating that the UE may start the TAT of a TAG when a TAG is configured. In an example embodiment, other trigger conditions may be defined to start or restart a TAT of a configured TAG. In an example embodiment, a UE may start or restart TAT of a TAG when the UE receives an uplink grant for an SCell in the TAG. In an example embodiment, a UE may start or restart a TAT of a TAG when the UE receives a MAC A/D command indicating activation of a cell in the TAG. The MAC A/D command may be the first MAC A/D command after configuration. In an example embodiment, a UE may start or restart TAT of a TAG when the UE receives a MAC A/D command indicating activation of a cell in the TAG and uplink signals (e.g. SRS, PUCCH signals, and/or PUSCH) is scheduled/configured for uplink transmission on the TAG. The MAC A/D command may be the first MAC A/D command after configuration. In an example implementation, an eNB may transmit one or more RRC messages comprising an IE for a TAG to indicate such configuration for the UE. Example embodiments may reduce unnecessary MAC overhead and reduce uplink transmission delays when a TAT of an sTAG is not running.

In an example embodiment, a wireless device may receive at least one message comprising: a timing advance group (TAG) index information element (IE) identifying a TAG; and one or more time alignment timer (TAT) IEs associated with the TAG. The one or more TAT IEs may indicate a value of the TAT IE. The wireless device may transmit uplink signals employing a stored value of a timing advance when a TAT of the TAG is not running.

In an example embodiment, a wireless device may receive at least one message comprising: a timing advance group (TAG) index information element (IE) identifying a TAG; and one or more time alignment timer (TAT) IEs associated with the TAG. The one or more TAT IEs may indicate a value of the TAT IE. The wireless device may start or restart a TAT of the TAG when at least one of the following conditions is true: the wireless devices configures the TAG; the wireless devices receives a MAC A/D command indicating activation of the cell in the TAG; the wireless devices receives a MAC A/D command indicating activation of the cell in the TAG and uplink signals are scheduled or configured for uplink transmission on the cell; and/or the wireless device receives an uplink grant for the cell in the TAG.

Figure 24:
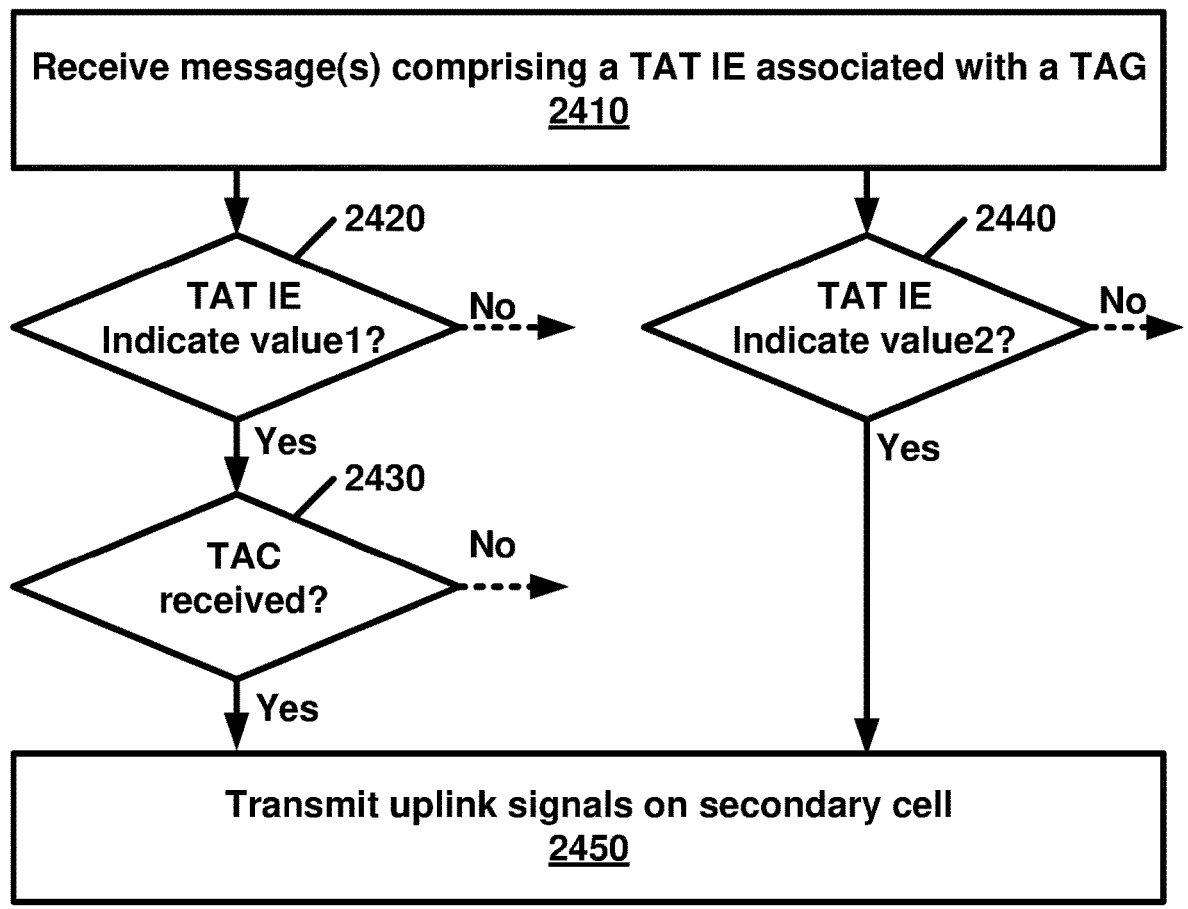
FIG. 24 is an example flow diagram of a random access process as per an aspect of an embodiment of the present invention.

FIG. 24 is an example flow diagram as per an aspect of an embodiment of the present invention. At 2410, a wireless device may receive, by a wireless device, at least one message comprising a time alignment timer (TAT) information element (IE) associated with a timing advance group (TAG). A value of the TAT IE may be selected from a finite set of predetermined values comprising, for example: a first value; and a second value. According to an embodiment, the first value may relate to subframes. According to an embodiment, message(s) may further comprises a TAG index IE identifying the TAG.

The wireless device may transmit, at 2450, uplink signals on a secondary cell in the TAG only after receiving a timing advance command (TAC) (determined at 2430) if the TAT IE indicates the first value (determined at 2420). Alternatively, the wireless device may transmit, at 2450, uplink signals on a secondary cell regardless of receiving the TAC if the TAT IE indicates the second value (determined at 2440). According to an embodiment, the TAC may comprise a TAG index and/or a timing advance value. According to an embodiment, a RAR may comprise a TAC (TAC without the TAG index). According to an embodiment, a random access response may comprise the TAC (TAC without the TAG index). According to an embodiment, the secondary cell may be a licensed assisted access (LAA) cell.

According to an embodiment, the wireless device may further consider the TAT of the TAG disabled if the TAT IE indicates the second value. According to an embodiment, the wireless device may transmit uplink signals employing a stored value of a timing advance when a TAT of the TAG is disabled.

Figure 25:
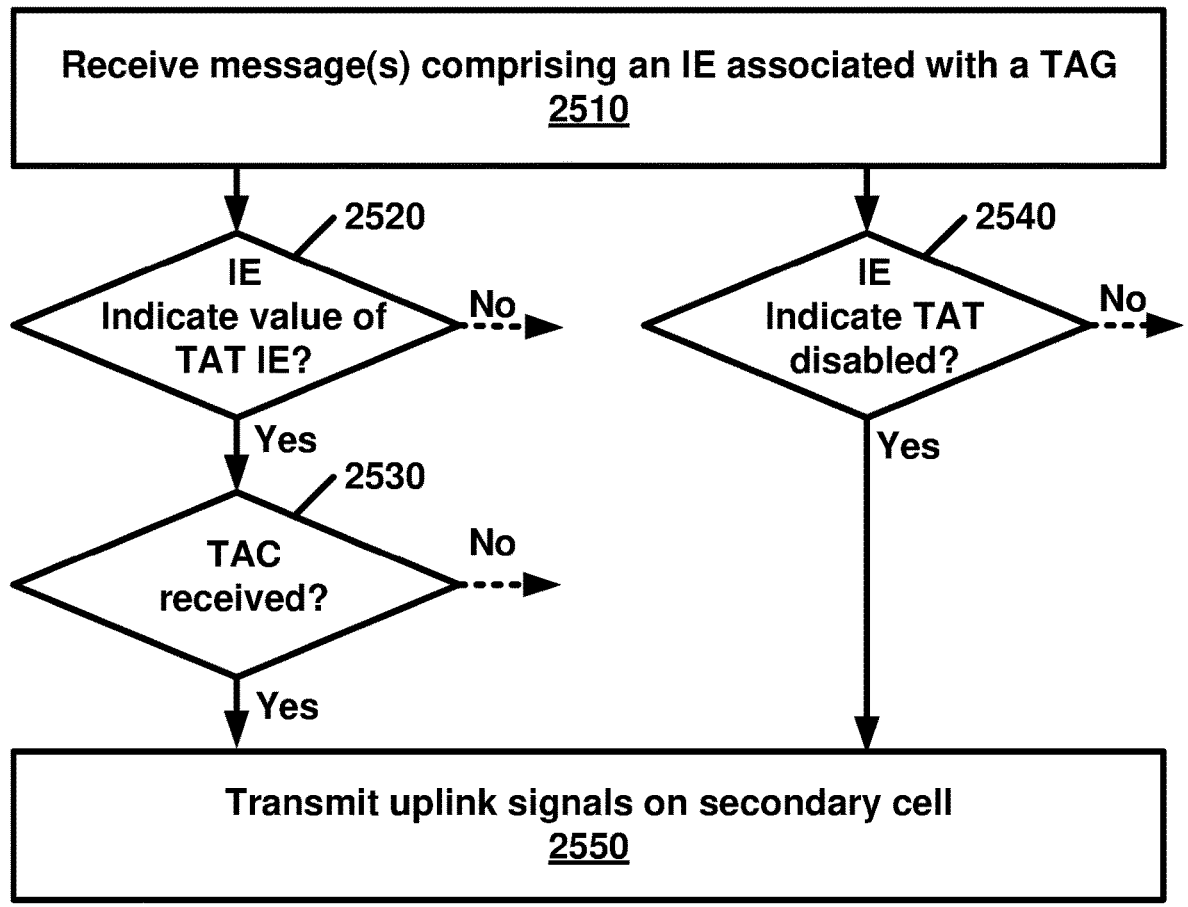
FIG. 25 is an example flow diagram of a random access process as per an aspect of an embodiment of the present invention.

FIG. 25 is an example flow diagram as per an aspect of an embodiment of the present invention. At 2510, a wireless device may receive, by a wireless device, at least one message comprising at least one information element (IE) associated with a timing advance group (TAG). The at least one IE may indicate at least one of: a value of the time alignment timer (TAT) IE, or a TAT of the TAG is disabled. According to an embodiment, the at least one message further comprises a TAG index IE identifying the TAG. According to an embodiment, the value of the TAT IE relates to subframes.

The wireless device may transmit uplink signals on a secondary cell (2550) in the TAG only after receiving a timing advance command (TAC) (determined at 2530) if the IE indicates the value of the TAT IE (determined at 2520). The wireless device may transmit uplink signals on a secondary cell (2550) regardless of receiving the TAC if the IE indicates that the TAT is disabled (determined at 2540).

According to an embodiment, the wireless device may further receive a random access response comprising the TAC. According to an embodiment, the wireless device may further transmit uplink signals employing a stored value of a timing advance when the TAT of the TAG is disabled. According to an embodiment, the TAC comprises a TAG index and a timing advance value. According to an embodiment, the secondary cell is a licensed assisted access (LAA) cell.

Figure 26:
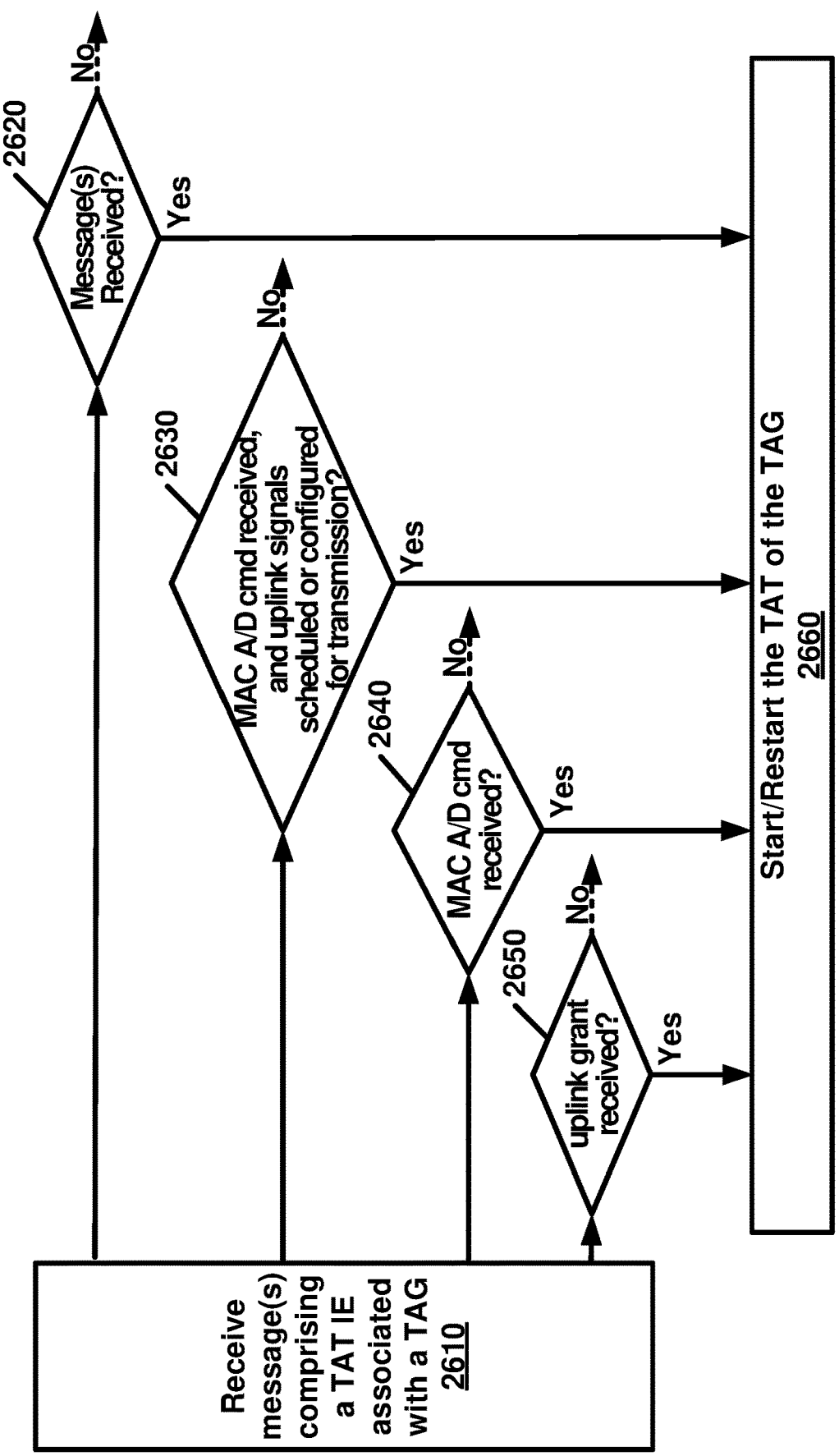
FIG. 26 is an example flow diagram of a random access process as per an aspect of an embodiment of the present invention.

FIG. 26 is an example flow diagram as per an aspect of an embodiment of the present invention. At 2610, a wireless device may receive, by a wireless device, at least one message comprising at least one time alignment timer (TAT) information element (IE) associated with a timing advance group (TAG). The at least one TAT IE may indicate a value of the TAT IE.

The wireless device may start and/or restart the TAT of the TAG (2660) in response to at least one of, for example, the following: (1) receiving one of the at least one message (2620), (2) receiving a media access control (MAC) activation/deactivation (A/D) command indicating activation of a cell in the TAG (2640), (3) receiving the MAC A/D command indicating activation of the cell in the TAG, and when uplink signals are scheduled or configured for uplink transmission on the cell (2630), and/or (4) receiving an uplink grant for the cell in the TAG (2650).

According to an embodiment, the at least one message may further comprise a TAG index IE identifying the TAG. According to an embodiment, the TAC may comprise a TAG index and a timing advance value. According to an embodiment, the TAG may comprise one or more licensed assisted access (LAA) cells. According to an embodiment, the value of the TAT IE may relate to subframes.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in a system comprising one or more TDD cells (e.g. frame structure 2 and/or frame structure 3-licensed assisted access). The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. § 112, paragraph 6. Claims that do not expressly include the phrase "means for" or "step for" are not to be interpreted under 35 U.S.C. § 112.

The invention claimed is:

1. A method comprising:
   transmitting, by a base station, a radio resource control (RRC) message indicating that a wireless device starts a time alignment timer of a timing advance group (TAG) in response to the RRC message; and
   starting the time alignment timer of the TAG before transmitting an initial medium access control (MAC) timing advance command (TAC) for the TAG and after transmitting the RRC message.

2. The method of claim 1, wherein the starting the time alignment timer is before initiating a random access process for the TAG.

3. The method of claim 1, further comprising receiving uplink data signals via a cell of the TAG before:
   receiving the initial MAC TAC; and
   performing an initial random access process for the TAG.

4. The method of claim 3, wherein the uplink data signals are transmitted based on a stored timing advance value.

5. The method of claim 1, further comprising transmitting the initial MAC TAC comprising a timing advance value after receiving uplink data from the wireless device.

6. The method of claim 1, wherein the RRC message comprises a time alignment timer information element (IE) indicating a value of the time alignment timer of the TAG.

7. The method of claim 1, wherein uplink transmission timing of one or more cells in the TAG is based on a timing of a reference cell in the TAG.

8. The method of claim 1, wherein the RRC message indicates a timing advance of zero for transmission of uplink data by the wireless device.

9. The method of claim 1, wherein the TAG comprises one or more cells.

10. The method of claim 1, further comprising transmitting an activation command activating a cell of the TAG.

11. A method comprising:
    transmitting, by a base station, a radio resource control (RRC) reconfiguration message that triggers a wireless device to start a time alignment timer of a timing advance group; and
    starting the time alignment timer of the timing advance group, before initiating a random access process for the timing advance group, in response to the RRC reconfiguration message.

12. The method of claim 11, wherein:
    the RRC reconfiguration message indicates configuration of the timing advance group; and
    the starting the time alignment timer is performed when the timing advance group is configured.

13. The method of claim 11, further comprising receiving an RRC reconfiguration complete message confirming that the RRC reconfiguration message is received by the wireless device.

14. The method of claim 11, further comprising receiving uplink data signals via a cell of the timing advance group:
    before receiving an initial medium access control (MAC) timing advance command (TAC); and
    before performing an initial random access process for the timing advance group.

15. The method of claim 14, wherein the uplink data signals are transmitted based on a stored timing advance value.

16. The method of claim 14, further comprising transmitting the initial MAC TAC comprising a timing advance value after receiving uplink data from the wireless device.

17. The method of claim 11, wherein the RRC reconfiguration message comprises a time alignment timer information element (IE) indicating a value of the time alignment timer of the timing advance group.

18. The method of claim 11, wherein uplink transmission timing of one or more cells in the timing advance group is based on a timing of a reference cell in the timing advance group.

19. The method of claim 11, wherein the RRC reconfiguration message indicates a timing advance of zero for transmission of uplink data by the wireless device.

* * * * *